(12) United States Patent  
McGuire et al.

(10) Patent No.: US 8,763,142 B2  
(45) Date of Patent: Jun. 24, 2014

(54) TOKENIZED PAYMENT PROCESSING SCHEMES

(75) Inventors: Kevin M. McGuire, Princeton Junction, NJ (US); Rush Taggart, Princeton, NJ (US); John Alex Chapman, Stamford, CT (US)

(73) Assignee: Princeton Payment Solutions, Princeton, NJ (US)

( * ) Notice: Subject to any disclaimer, the term of this patent is extended or adjusted under 35 U.S.C. 154(b) by 149 days.

(21) Appl. No.: 13/215,961

(22) Filed: Aug. 23, 2011

(65) Prior Publication Data

US 2011/0307710 A1    Dec. 15, 2011

Related U.S. Application Data

(63) Continuation-in-part of application No. 12/755,459, filed on Apr. 7, 2010, now Pat. No. 8,584,251.

(60) Provisional application No. 61/376,245, filed on Aug. 23, 2010, provisional application No. 61/426,074, filed on Dec. 22, 2010, provisional application No. 61/167,221, filed on Apr. 7, 2009.

(51) Int. Cl.  
*H04L 29/06* (2006.01)

(52) U.S. Cl.  
USPC ............ 726/26; 726/9; 726/20; 713/183; 713/184; 235/380; 705/66

(58) Field of Classification Search  
USPC .............. 713/183, 184; 726/2, 9, 20, 26; 235/380; 705/64–67  
See application file for complete search history.

(56) References Cited

U.S. PATENT DOCUMENTS

| 6,227,447 B1 | 5/2001 | Campisano |
| 6,314,439 B1 | 11/2001 | Bates et al. |
| 6,961,840 B2 | 11/2005 | Fleming et al. |

(Continued)

FOREIGN PATENT DOCUMENTS

WO    WO 00/68866 A1    11/2000

OTHER PUBLICATIONS

Notification of Transmittal of the International Search Report and the Written Opinion; Mailed Feb. 2, 2012 for corresponding PCT Application No. PCT/US11/48829.

(Continued)

*Primary Examiner* — Hadi Armouche  
*Assistant Examiner* — Hee Song  
(74) *Attorney, Agent, or Firm* — Mendelsohn, Drucker & Dunleavy, P.C.; Kevin M. Drucker; Steve Mendelsohn

(57) ABSTRACT

A payment processing system for accepting manually-entered payment-card numbers. Rather than entering a payment-card account number into an application module, the card number is instead captured and stored within a tokenizer prior to being sent to the application module. The tokenizer then returns a random token to the calling application as a pointer to the original payment-card number. The token has no algorithmic relationship with the original payment-card number, so that the payment-card number cannot be derived based on the token itself. Since the token is not considered cardholder data, the token may be used in an application module without the module or its connected hardware from being subject to regulatory standards compliance. Some embodiments involve browser-based schemes, and some embodiments involve PIN-entry device-based schemes.

24 Claims, 22 Drawing Sheets

(56) References Cited

U.S. PATENT DOCUMENTS

| | | |
|---|---|---|
| 7,099,850 B1 | 8/2006 | Mann, II et al. |
| 7,885,870 B2 | 2/2011 | Nam et al. |
| 8,185,931 B1 | 5/2012 | Reeves |
| 8,370,913 B2 | 2/2013 | Hodgkinson et al. |
| 2001/0000709 A1 | 5/2001 | Takahashi et al. |
| 2002/0095389 A1 | 7/2002 | Gaines |
| 2003/0033208 A1 | 2/2003 | Marin et al. |
| 2003/0120745 A1 | 6/2003 | Katagishi et al. |
| 2003/0140045 A1* | 7/2003 | Heninger et al. ............... 707/10 |
| 2003/0182583 A1 | 9/2003 | Turco |
| 2004/0030935 A1 | 2/2004 | Kai |
| 2004/0078334 A1 | 4/2004 | Malcolm et al. |
| 2004/0079334 A1 | 4/2004 | Hasegawa |
| 2005/0140675 A1 | 6/2005 | Billingsley et al. |
| 2005/0198624 A1* | 9/2005 | Chipman .................... 717/146 |
| 2005/0203753 A1 | 9/2005 | Kamat et al. |
| 2006/0026438 A1 | 2/2006 | Stern et al. |
| 2007/0079366 A1* | 4/2007 | Geffner ......................... 726/12 |
| 2007/0192245 A1* | 8/2007 | Fisher et al. .................... 705/39 |
| 2007/0262138 A1* | 11/2007 | Somers et al. ................ 235/380 |
| 2008/0086632 A1 | 4/2008 | Kagle |
| 2008/0097914 A1 | 4/2008 | Dicks et al. |
| 2008/0162348 A1 | 7/2008 | Lee et al. |
| 2008/0229410 A1 | 9/2008 | Felsted et al. |
| 2010/0076956 A1* | 3/2010 | Ranney et al. ................ 707/722 |

OTHER PUBLICATIONS

Non-Final Office Action; Mailed Jul. 19, 2012 for corresponding U.S. Appl. No. 12/755,459.

"Credit Card Tokenization," Braintree Payment Solutions. <http://braintreepaymentsolutions.com/credit-card-storage/tokenization/?gclid=CNmGip6x3JkCFRNM5QodCG_aXg> Accessed Apr. 14, 2009.

Final Office Action; Mailed Apr. 19, 2013 for corresponding U.S. Appl. No. 12/755,459.

\* cited by examiner

```
Imports System.Net
Imports System.IO
Imports System.Windows.Forms

Public Class Form1

Inherits System.Windows.Forms.Form

#Region " Windows Form Designer generated code "

Dim url As String = "http://cardsecure/cardsecure/cs?action=CE&data="
    Dim url2 As String = "http://cardsecure/cardsecure/cs?action=CE&data="

Public Sub New()
        MyBase.New()

'This call is required by the Windows Form Designer.
        InitializeComponent()

'Add any initialization after the InitializeComponent() call
        checkIniFile()

End Sub

'Form overrides dispose to clean up the component list.
    Protected Overloads Overrides Sub Dispose(ByVal disposing As Boolean)
        If disposing Then
            If Not (components Is Nothing) Then
                components.Dispose()
            End If
        End If
        MyBase.Dispose(disposing)
    End Sub 'Required by the Windows Form Designer
    Private components As System.ComponentModel.IContainer 'NOTE: The following procedure is required by the Windows Form Designer
    'It can be modified using the Windows Form Designer.
    'Do not modify it using the code editor.
    Friend WithEvents TextBox1 As System.Windows.Forms.TextBox
    Friend WithEvents Button1 As System.Windows.Forms.Button
    Friend WithEvents Label2 As System.Windows.Forms.Label
    Friend WithEvents Label3 As System.Windows.Forms.Label
    Friend WithEvents PictureBox3 As System.Windows.Forms.PictureBox
    <System.Diagnostics.DebuggerStepThrough()> Private Sub InitializeComponent()
        Dim resources As System.Resources.ResourceManager = New System.Resources.ResourceManager(GetType(Form1))
        Me.TextBox1 = New System.Windows.Forms.TextBox
        Me.Button1 = New System.Windows.Forms.Button
        Me.Label2 = New System.Windows.Forms.Label
        Me.Label3 = New System.Windows.Forms.Label
        Me.PictureBox3 = New System.Windows.Forms.PictureBox
        Me.SuspendLayout()
        '
```

FIG. 7a

```
'TextBox1
'
Me.TextBox1.BorderStyle = System.Windows.Forms.BorderStyle.FixedSingle
Me.TextBox1.Location = New System.Drawing.Point(16, 46)
Me.TextBox1.MaxLength = 19
Me.TextBox1.Name = "TextBox1"
Me.TextBox1.Size = New System.Drawing.Size(112, 20)
Me.TextBox1.TabIndex = 1
Me.TextBox1.TabStop = False
Me.TextBox1.Text = "Enter Card"
Me.TextBox1.TextAlign = System.Windows.Forms.HorizontalAlignment.Center
Me.TextBox1.WordWrap = False
'
'Button1
'
Me.Button1.AllowDrop = True
Me.Button1.FlatStyle = System.Windows.Forms.FlatStyle.Popup
Me.Button1.Font = New System.Drawing.Font("Microsoft Sans Serif", 10.0!,
System.Drawing.FontStyle.Regular, System.Drawing.GraphicsUnit.Point, CType(0, Byte))
Me.Button1.Location = New System.Drawing.Point(16, 72)
Me.Button1.Name = "Button1"
Me.Button1.Size = New System.Drawing.Size(112, 24)
Me.Button1.TabIndex = 2
Me.Button1.Text = "Tokenize"
'
'Label2
'
Me.Label2.Font = New System.Drawing.Font("Microsoft Sans Serif", 8.0!,
System.Drawing.FontStyle.Regular, System.Drawing.GraphicsUnit.Point, CType(0, Byte))
Me.Label2.Location = New System.Drawing.Point(16, 104)
Me.Label2.Name = "Label2"
Me.Label2.Size = New System.Drawing.Size(112, 32)
Me.Label2.TabIndex = 3
'
'Label3
'
Me.Label3.Font = New System.Drawing.Font("Microsoft Sans Serif", 7.0!,
System.Drawing.FontStyle.Regular, System.Drawing.GraphicsUnit.Point, CType(0, Byte))
Me.Label3.Location = New System.Drawing.Point(16, 136)
Me.Label3.Name = "Label3"
Me.Label3.Size = New System.Drawing.Size(112, 24)
Me.Label3.TabIndex = 6
Me.Label3.Text = "Copyright Princeton Payment Solutions, 2009"
Me.Label3.TextAlign = System.Drawing.ContentAlignment.TopCenter
'
'PictureBox3
'
Me.PictureBox3.Image = CType(resources.GetObject("PictureBox3.Image"), System.Drawing.Image)
Me.PictureBox3.Location = New System.Drawing.Point(28, 8)
Me.PictureBox3.Name = "PictureBox3"
Me.PictureBox3.Size = New System.Drawing.Size(88, 32)
Me.PictureBox3.TabIndex = 7
Me.PictureBox3.TabStop = False
'
```

FIG. 7b

```
'Form1
'
Me.AcceptButton = Me.Button1
Me.AutoScaleBaseSize = New System.Drawing.Size(5, 13)
Me.BackColor = System.Drawing.SystemColors.Window
Me.ClientSize = New System.Drawing.Size(144, 165)
Me.Controls.Add(Me.PictureBox3)
Me.Controls.Add(Me.Label3)
Me.Controls.Add(Me.Label2)
Me.Controls.Add(Me.Button1)
Me.Controls.Add(Me.TextBox1)
Me.Name = "Form1"
Me.Text = "PPS CardSecure"
Me.TopMost = True
Me.ResumeLayout(False)

End Sub
  Private Sub Button1_Click(ByVal sender As System.Object, ByVal e As System.EventArgs) Handles
Button1.Click
    Dim CertificatePolicy As MyCertificateValidation ServicePointManager.CertificatePolicy = CertificatePolicy
    'MsgBox("textbox1=" & TextBox1.Text)
    Me.Label2.ForeColor = System.Drawing.Color.Black If TextBox1.Text.Length < 12 Then
       Clipboard.SetDataObject("Invalid Card Number", True)
       Me.Label2.Text = "Card Number Too short"
       Me.Label2.ForeColor = System.Drawing.Color.Red
       Return
    End If
    If TextBox1.Text.Length > 20 Then
       Clipboard.SetDataObject("Invalid Card Number", True)
       Me.Label2.Text = "Card Number Too LONG"
       Me.Label2.ForeColor = System.Drawing.Color.Red
       Return
    End If If Not Luhnsum(TextBox1.Text) Then
       Clipboard.SetDataObject("Invalid Card Number", True)
       Me.Label2.Text = "Invalid Card Number"
       Me.Label2.ForeColor = System.Drawing.Color.Red
       Return
    End If ' Get Token data Try
       Me.Label2.Text = "Getting Token..."
       Me.Refresh()
       Dim client As WebClient = New WebClient
       Dim req As String = url & "/cardsecure/cs?action=CE&data=" & TextBox1.Text
       'MsgBox("request=" & req)
       Dim res As Stream = client.OpenRead(req)
       Dim reader As StreamReader = New StreamReader(res)
       Dim str As String = ""
       str = reader.ReadLine()
```

FIG. 7c

```vb
            If str.Substring(7, 2) = "ER" Then
                Clipboard.SetDataObject("Invalid Card Number", True)
                Me.Label2.Text = "Invalid Card Number"
                Me.Label2.ForeColor = System.Drawing.Color.Red
                Return
            End If
            Clipboard.SetDataObject(str.Substring(str.IndexOf("data=") + 5), True)
            Me.TextBox1.Text = ""
            Me.Label2.Text = "Token Ready," & vbLf & "CTRL-V to paste"
        Catch x As Exception
            Try
                Dim client As WebClient = New WebClient
                Dim req As String = url2 & "/cardsecure/cs?action=CE&data=" & TextBox1.Text
                '        MsgBox("request=" & req)
                Dim res As Stream = client.OpenRead(req)
                Dim reader As StreamReader = New StreamReader(res)
                Dim str As String = ""
                str = reader.ReadLine()
                If str.Substring(7, 2) = "ER" Then
                    Clipboard.SetDataObject("Invalid Card Number", True)
                    Me.Label2.Text = "Invalid Card Number"
                    Me.Label2.ForeColor = System.Drawing.Color.Red
                    Return
                End If
                Clipboard.SetDataObject(str.Substring(str.IndexOf("data=") + 5), True)
                Me.TextBox1.Text = ""
                Me.Label2.Text = "Token Ready," & vbLf & "CTRL-V to paste"
            Catch y As Exception
                MsgBox("ERROR   ERROR " & vbLf & y.ToString)
            End Try
        End Try End Sub Private Sub checkIniFile()
        Dim iniFileName As String
        iniFileName = Application.StartupPath & "\cs.ini"
        If File.Exists(iniFileName) = False Then
            Return
        End If Dim oReader As New StreamReader(iniFileName)
        Dim line As String
        While oReader.Peek <> -1
            line = oReader.ReadLine()
            If line.Length() > 3 AndAlso line.Substring(0, 4) = "url=" Then
                url = line.Substring(4)
            End If
            If line.Length() > 3 AndAlso line.Substring(0, 5) = "url2=" Then
                url2 = line.Substring(5)
            End If
        End While
        oReader.Close()
        'MsgBox("url=" & url & vbLf & "url2=" & url2)
    End Sub
```

FIG. 7d

```
Function Luhnsum(ByVal CCNumber As String) As Boolean
    'gets the credit card number,then checks to see if the number
    'is a number. Then adds the number and returns the sum.

'declare the variables
    Dim count, num, sum As Integer
    Dim timestwo As Boolean = False 'loop through the numbers
    For count = CCNumber.Length To 1 Step -1
        If Not IsNumeric(CCNumber.Substring(count - 1, 1)) Then
            Return False
        End If 'get the next number
        num = CInt(CCNumber.Substring(count - 1, 1))
        If timestwo Then
            num = num * 2
            If (num > 9) Then
                num = num - 9
            End If
        End If
        sum = sum + num
        timestwo = Not timestwo
    Next
    If ((sum Mod 10) = 0) Then
        Return True
    End If
    Return False
End Function
End Region Private Sub Label1_Click(ByVal sender As System.Object, ByVal e As System.EventArgs)

End Sub

Private Sub PictureBox1_Click(ByVal sender As System.Object, ByVal e As System.EventArgs)

End Sub

Private Sub Form1_Load(ByVal sender As System.Object, ByVal e As System.EventArgs) Handles MyBase.Load End Sub Private Sub Label3_Click(ByVal sender As System.Object, ByVal e As System.EventArgs) Handles Label3.Click End Sub Private Sub Label2_Click(ByVal sender As System.Object, ByVal e As System.EventArgs) Handles Label2.Click End Sub
End Class
```

FIG. 7e

```
host = "http://grizzly:8080"
testing = False

On Error Resume Next
Set sh = CreateObject("WScript.Shell")
sh.run """C:\Program Files\SAP\SapSetup\setup\SAL\SapLogon.sal"""
If Err<>0 Then
  ProblemE "can't run SAPStart/SAPLogon"
  WScript.Quit
End If
WScript.Sleep 5000
Set gui = GetObject ("SAPGUI")
If Err<>0 Then
  ProblemE "can't access SAPgui object"
  WScript.Quit
End If
Set app = gui.GetScriptingEngine
If Err<>0 Then
  ProblemE "scripting disabled or rejected"
  WScript.Quit
End If
Attach
more=True
Do
  Wscript.Sleep(5000)
  Err=0
  probe=app.Id
  If Err=462 Then
    Problem "GUI gone, exiting"
    more=False
  ElseIf Err<>0 Then
    ProblemE "probe"
  Else
    Trace "probe"
  End If
Loop While more
WScript.Quit
Sub Attach
  On Error Resume Next
  WScript.ConnectObject app,"App_"
  If Err<>0 Then
    ProblemE "connect app="&app.Id
  End If
  For Each con in app.children
    For Each ses in con.children
      WScript.ConnectObject ses,"Session_"
      If Err<>0 Then
        ProblemE "connect "&ses.Id
      Else
        Trace "connect "&ses.Id
      End If
    Next
  Next
End Sub
```

FIG. 8a

```
Sub App_CreateSession (ByVal sess)
  Trace "Create:"+sess.Id
  WScript.ConnectObject sess,"Session_"
End Sub
Sub App_DestroySession (ByVal sess)
  Trace "Destroy:"+sess.Id
End Sub
Sub Session_Destroy(sess)
  Trace "Destroy@"+sess.Id
End Sub Sub Session_StartRequest (sess)
  Set wnd=sess.children(0)
  TraceO "Req",wnd
  For Each area in wnd.children
    If Right(area.Id,4)="/usr" Then
      Grind area
    End If
  Next
  Trace "done"
End Sub
Sub Grind (obj)
  line = prefix &":Id="&obj.Id &",Name="&obj.Name &",Type="&obj.Type
  Select Case obj.typeAsNumber
  Case
1,2,20,21,22,30,31,32,33,34,35,40,41,42,50,51,62,70,71,72,74,80,81,82,90,91,100,101,102,103,110,111
    line = line&",text="&obj.text
  End Select
  If Instr (line, "CCNUM") Then
    Trace "FOUND:"&line
    val = obj.text
    If IsNumeric (val) Then
      tok = DoToken (val)
      If tok <> "" Then
        obj.text = tok
        Trace "Tokenized " & val & " -> " & tok
      End If
    End If
  Else
    'Trace "not-"&line
  End If
  On Error Resume Next
  Set children = obj.Children
  If IsObject (children) Then
    For Each child in children
      Grind child
    Next
  End If
End Sub
Function DoToken (val)
  Set http = CreateObject ("MSXML2.XMLHTTP")
  Call http.open ("GET", host & "/cardsecure/cs?action=CE&data=" & val, False, "", "")
  Err=0
  http.send
  If Err<>0 Then
    ProblemE "communication error"
```

FIG. 8b

```
  Else
    resp = http.responsetext
    If Left(resp,9) <> "action=CE" Then
      Problem "cardsecure error: " & http.responsetext
    Else
      DoToken = Mid(resp,Instr(resp,"data=")+5)
    End If
  End If
End Function Sub TraceO (prefix,obj)
  line = prefix &":Id="&obj.Id &",Name="&obj.Name &",Type="&obj.Type
  Select Case obj.typeAsNumber
  Case
1,2,20,21,22,30,31,32,33,34,35,40,41,42,50,51,62,70,71,72,74,80,81,82,90,91,100,101,102,103,110,111
    line = line&",text="&obj.text
  End Select
  Trace line
End Sub
Sub ProblemE (str)
  Problem str&"*"&Err.Number&":"&Err.Source&":"&Err.Description
End Sub
Sub Problem (str)
  WScript.Echo str
End Sub
Sub Trace (str)
  If testing Then
    WScript.Echo str
  End If
End Sub
```

FIG. 8c

```
when HTTP_REQUEST {
        set URI [HTTP::uri]
        set OriginalPool "pps_test_pool"

# ignore gets
        if {[HTTP::method] equals "GET"} {
                SSL::disable serverside
                pool $OriginalPool
                return
        } ignore unwanted pages
        # matchclass may be unavailable in some future version, so rewrite with "class match"
        if {! [matchclass [string tolower $URI] ends_with ::TokenURIList]} {
                SSL::disable serverside
                pool $OriginalPool
                return
        } first pass, catch client content
        if {! [info exists OriginalRequestData]} {
                #log local0. "Original Request data does not exist."
                set attempts 0
                set OriginalRequest [HTTP::request]
                HTTP::collect [HTTP::header Content-Length]
                return
        } second pass, reassemble client request with token
        #log local0. "First:$FirstPart"
        #log local0. "Last:$LastPart"
        set TokenizedRequestData "$FirstPart$token$LastPart"
        #log local0. "TRD is $TokenizedRequestData"
        HTTP::payload replace 0 [string length [HTTP::payload]] $TokenizedRequestData make sure we have the correct pool
        #log local0. "New payload is [HTTP::payload]"
        HTTP::header replace Content-Length [string length [HTTP::payload]]
        pool $OriginalPool
        #log local0. "Requesting [HTTP::request]"

#This tells us to skip Token collection in HTTP_RESPONSE_DATA
        unset OriginalRequest
        SSL::disable serverside
}
```

FIG. 9a

```
when HTTP_REQUEST_DATA {
            #log local0. "We're in HTTP_REQUEST_DATA"
            if {[info exists token]} {      return    } get payload, find CCNUM, return if field not found
            set payload [HTTP::payload]
            set pos [string first "CCNUM=" $payload]
            if {$pos < 0 } {
                        pool $OriginalPool
                        unset OriginalRequest
                        SSL::disable serverside
                        return
            } log local0. "Body is $payload, and we found CCNUM at $pos offset"

skip CCNUM=, substr to end of payload
            set pos [expr {$pos + 6}]
            set cc [substr $payload $pos "\n"]

# check for more fields, if find next & cut there
            set end [string first "&" $cc]
            #log local0. "Found pos $pos, end $end, and cc $cc"
            if {$end > 0 } { set cc [substr $cc 0 $end] } verify cc is all numeric, return if not
            if {$cc matches_regex { (?:3[4|7]\d{13})|(?:4\d{15})|(?:5[1-5]\d{14})|(?:6011\d{12} ) } } {
            } else {
                        pool $OriginalPool
                        unset OriginalRequest
                        SSL::disable serverside
                        return
            }
            #validate for luhn, stolen from CCscrubber
set card_len [string length $cc]
set double [expr {$card_len & 1}]
set chksum 0
# Calculate MOD10
            for { set i 0 } { $i < $card_len } { incr i } {
                        set c [string index $cc $i]
                        if {($i & 1) == $double} {
                                    if {[incr c $c] >= 10} {incr c -9}
                        }
                        incr chksum $c
            }

# Is it valid?
            if {($chksum % 10) != 0} {
                        pool $OriginalPool
                        unset OriginalRequest
                        SSL::disable serverside
                        return
            }
```

FIG. 9b

```
                # good card, so get a Token
                #set OriginalRequestData [HTTP::payload]
                set OriginalRequestData 1
                set FirstPart [getfield [HTTP::payload] $cc 1]
                set LastPart [getfield [HTTP::payload] $cc 2]
                #set OriginalRequest [HTTP::request]
                #
                #HTTP::payload replace 0 [string length $OriginalRequestData] ""
                #HTTP::header remove Content-Length
                HTTP::uri "/cardsecure/cs?action=CE&data=$cc"
                #Client side SSL and CardSecure Pool
                pool CardSecurePool
                #SSL::enable serverside
                #log local0. "URI is now [HTTP::uri], going to pool [LB::server pool]"
} when HTTP_RESPONSE {
                # log local0. "We're in HTTP_RESPONSE and talking to [LB::server addr]"
                if { [info exists OriginalRequest] } { HTTP::collect 40 }
}
when HTTP_RESPONSE_DATA {
                #log local0. "In Response Data, with data:[HTTP::payload]"
                set t [HTTP::payload]
                set pos [expr {[string first "action=" $t] + 7}]
                set end [expr $pos+2]
                set action [substr $t $pos 2]

if { $action equals "CE" } {
                } else {
                        log local0. "CardSecure Error Response:[HTTP::payload]"
                } set pos [expr {[string first "data=" $t] + 5}]
                set token [substr $t $pos "\n"]
                #log local0. "Token is $token"
                #Now Retry the original
                HTTP::retry $OriginalRequest
} when LB_FAILED {
incr attempts
#               if { $attempts < [active_members [LB::server pool]] } {
#                       LB::reselect
                log local0. "LB Failed... Pool was [LB::server pool] Server was [LB::server addr]"
                #}
}
```

FIG. 9c

```
<html><head>
<script>
var host = 'https://token.server.com/';
function getToken(url)
{
        var headID = document.getElementsByTagName("head")[0];
        var newScript = document.createElement('script');
        newScript.type = 'text/javascript';
        var url = host + 'cardsecure/cs?action=CE&type=json&data=' +
order.ccnum.value;
        newScript.src = url;
        headID.appendChild(newScript);
} function processToken(resp)
{
        eval (resp);
        order.token.value=resp.data;
        order.ccnum.value = resp.data;        // should replace with a masked value
}

</script></head><body>
<h3>PPS JSON Test Page</h3>

<form name="order">
<input type="hidden" name="token" size="19"/>
Please enter a test Number<br>
<input type="text" name="ccnum" size="19"/>  <br>
Then click the button<br>
<input type="button" value="hit me" onClick="javascript:getToken();"/>
</form></body></html>
```

FIG. 12

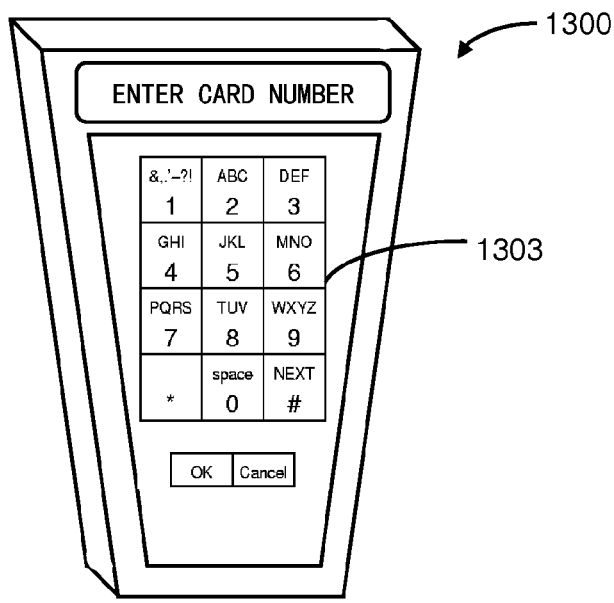

FIG. 13

TOKENIZED PAYMENT PROCESSING SCHEMES

CROSS-REFERENCE TO RELATED APPLICATIONS

This application claims priority to U.S. Provisional Patent Application Ser. No. 61/376,245, filed Aug. 23, 2010, the disclosure of which is incorporated herein by reference in its entirety. This application also claims priority to co-pending U.S. Provisional Patent Application Ser. No. 61/426,074, filed Dec. 22, 2010, the disclosure of which is incorporated herein by reference in its entirety. This application is also a continuation-in-part of co-pending U.S. patent application Ser. No. 12/755,459, filed Apr. 7, 2010, which claims priority to co-pending U.S. Provisional Patent Application Ser. No. 61/167,221, filed Apr. 7, 2009, the disclosures of both of which are incorporated herein by reference in their entirety.

BACKGROUND OF THE INVENTION

1. Field of the Invention

The present invention relates to the introduction, storage, and use of confidential information in corporate enterprise systems, and, more specifically but not exclusively, to the use of tokens as substitutes for confidential information in such systems.

2. Description of the Related Art

The payment-card industry (PCI), in response to the growing theft of payment-card data resulting from inadequate information technology security, has had an evolving set of security standards. Initially, the payment-application best-practices (PABP) guidelines promulgated by the industry required merchants to encrypt card numbers.

Limitations in the PABP guidelines resulted in the September, 2006 release of version 1.1 of the PCI Data-Security Standard (DSS) and the related PCI Security-Audit Procedures. These programs required more than mere encryption and mandated compliance in order to process payment-card transactions. Under these programs, merchants are required to document their compliance with the DSS, depending on their annual volumes. The largest merchants must undergo an on-site audit to verify merchant and processor compliance. Medium-sized and smaller merchants are permitted to complete a self-assessment, attesting that various security features and programs have been implemented.

According to the DSS standards, cardholder data is defined as any clear or encrypted primary account number (PAN). The DSS standards declare that any system that "processes, stores, or transmits" cardholder data, as well as any system on the same network segment (e.g., one of a plurality of subnetworks making up a corporate network), must comply with the requirements of the DSS standards.

Additionally, certain personally-identifiable information (PII) may also give rise to regulatory scrutiny, e.g., by federal law or the laws of individual states in the United States. The term PII refers to information that can be used to uniquely identify, contact, or locate a single person or can be used with other sources to uniquely identify a single individual. For example, in a 2007 memorandum from the Executive Office of the President, Office of Management and Budget (OMB), the U.S. Government defined PII information as: "Information which can be used to distinguish or trace an individual's identity, such as their name, social security number, biometric records, etc. alone, or when combined with other personal or identifying information which is linked or linkable to a specific individual, such as date and place of birth, mother's maiden name, etc."

Similarly, in the European Union, Article 2a of EU directive 95/46/EC defines "personal data" as meaning "any information relating to an identified or identifiable natural person ('data subject'); an identifiable person is one who can be identified, directly or indirectly, in particular by reference to an identification number or to one or more factors specific to his physical, physiological, mental, economic, cultural or social identity."

Likewise, "personal information" is defined in a section of the California data breach notification law, SB1386, as meaning "an individual's first name or first initial and last name in combination with any one or more of the following data elements, when either the name or the data elements are not encrypted: (1) social security number; (2) driver's license number or California Identification Card number; (3) account number, credit or debit card number, in combination with any required security code, access code, or password that would permit access to an individual's financial account."

Compliance with DSS standards and other regulatory requirements of various jurisdictions typically requires that all computer systems involved in the processing of unencrypted sensitive data, such as PCI and PII data, and possibly including an entire corporate data center, be compliant with such standards and requirements. The cost of compliance, as well as the cost of verifying compliance, can be substantial, both operationally and financially.

SUMMARY OF THE INVENTION

Problems in the prior art are addressed in accordance with the principles of the present invention by providing a data-processing system, such as a payment processing system, including a tokenizer, such as a card encryption and storage system (CES) employing a tokenization feature. With tokenization, rather than entering confidential information, such as a payment-card account number, into an application module, such as an enterprise resource-planning (ERP) system (e.g., SAP ERP), the confidential information is instead captured and stored within the tokenizer prior to being sent to the application module. The tokenizer then returns a random string called a "token" to the calling application as a pointer to the original payment-card number. The token preferably has no algorithmic relationship with the original payment-card number, so that the payment-card number cannot be derived based on the token itself (such as by merely applying a decryption algorithm to the token). Accordingly, this token is not considered cardholder data, because it is a random string from which it is not possible to extrapolate any original cardholder data without the use of the tokenizer, which contains a list of payment-card numbers and the tokens to which they correspond. As such, the token may be used in an application module without the application module having to comply with regulatory standards, e.g., the PCI DSS standards.

Under the PCI DSS regulatory scheme, if cardholder data (including any clear or encrypted payment-card account number) is present in an application module, either alone or together with a cardholder name, service code, and/or expiration date, then the application module is within the scope of regulatory scrutiny. Accordingly, if cardholder data can be replaced by some other, non-account-number string, then a host application no longer employs cardholder data and is out of the scope of PCI DSS regulatory scrutiny.

Various embodiments of the invention provide systems, methods, and apparatuses for preventing the transmission of confidential information between computers in a card-payment processing scheme in which payment-card numbers can be manually entered. Some embodiments involve browser-based schemes, and some embodiments involve PIN-entry device-based schemes.

In one embodiment, the present invention provides a first-computer-implemented method for preventing the transmission of confidential information between a first computer and a second computer in communication with the first computer. The method includes: (a) the first computer receiving information for performing a transaction, the information including confidential information manually entered by a user; (b) the first computer sending the confidential information to a third computer; (c) the first computer receiving, from the third computer, an executable script containing a token having no algorithmic relationship to the confidential information; (d) the first computer executing the script to obtain the token; and (e) the first computer sending to the second computer (i) the information for performing the transaction, except for the confidential information, and (ii) the token.

In another embodiment, the present invention provides an apparatus for preventing the transmission of confidential information to a second computer in communication with the apparatus. The apparatus is adapted to: (a) receive information for performing a transaction, the information including confidential information manually entered by a user; (b) send the confidential information to a third computer; (c) receive, from the third computer, an executable script containing a token having no algorithmic relationship to the confidential information; (d) execute the script to obtain the token; and (e) send to the second computer (i) the information for performing the transaction, except for the confidential information, and (ii) the token.

In yet another embodiment, the present invention provides a first-computer-implemented method for preventing the transmission of confidential information between a first computer and a second computer in communication with the first computer. The method includes the steps of: (a) the first computer receiving, from an entry device in communication with the first computer, information for performing a transaction, the information including confidential information manually entered by a user on the entry device; (b) the first computer sending the confidential information to a third computer; (c) the first computer receiving, from the third computer, a token having no algorithmic relationship to the confidential information; and (d) the first computer sending to the second computer (i) the information for performing the transaction, except for the confidential information, and (ii) the token.

In a further embodiment, the present invention provides an apparatus for preventing the transmission of confidential information between a first computer and a second computer in communication with the first computer. The apparatus is adapted to: (a) receive, from an entry device in communication with the first computer, information for performing a transaction, the information including confidential information manually entered by a user on the entry device; (b) send the confidential information to a third computer; (c) receive, from the third computer, a token having no algorithmic relationship to the confidential information; and (d) send to the second computer (i) the information for performing the transaction, except for the confidential information, and (ii) the token.

In some embodiments, the executable script is a JavaScript Object Notation (JSON) script.

In some embodiments, in step (b), the first computer sends the confidential information to a third computer via a proxy server; and in step (c), the first computer receives the executable script from the third computer via the proxy server.

In some embodiments, at least one of steps (b) and (c) employs a port-forwarding scheme.

In some embodiments, the scheme further includes the first computer receiving the confidential information by means of the user typing the confidential information into an entry field of a window displayed by a software program; and the first computer replacing the confidential information in the entry field of the window of the software program with the token.

In some embodiments, the first computer receives the token in the form of a function call argument.

In some embodiments, the confidential information manually entered by the user on the entry device is provided to the first computer in encrypted form; the form of encryption employs one or more keys for decrypting the confidential information; and the first computer does not have the one or more keys.

In some embodiments, the entry device is coupled to the first computer via a Universal Serial Bus (USB) interface.

In some embodiments, the entry device is a PIN-entry pad having firmware configured to: accept, via keypad entry, a number longer than four digits and sufficiently long to accommodate a payment-card number; encrypt the number; and output, to the first computer, the encrypted number in step (a).

In some embodiments, the number is encrypted using a Derived Unique Key Per Transaction (DUKPT) key-management scheme.

In still a further embodiment, the present invention provides a method for generating an encrypted payment-card number. The method includes: accepting, via a keypad, a number longer than four digits and sufficiently long to accommodate a payment-card number; encrypting the number; and outputting, via an interface, the encrypted number.

In yet a further embodiment, the present invention provides a payment-card number entry device. The device includes: a keypad; a processor; an interface; and a memory containing instructions for the processor to: accept, via the keypad, a number longer than four digits and sufficiently long to accommodate a payment-card number; encrypt the number; and output, via the interface, the encrypted number.

BRIEF DESCRIPTION OF THE DRAWINGS

Other aspects, features, and advantages of the present invention will become more fully apparent from the following detailed description and the accompanying drawings in which like reference numerals identify similar or identical elements.

FIGS. 7a-7e collectively show exemplary program code for implementing the algorithm of FIG. 3;

FIGS. 8a-c collectively show exemplary program code for implementing the algorithm of FIG. 4;

FIGS. 9a-c collectively show exemplary program code for implementing the algorithm of FIG. 6;

FIG. 12 shows exemplary program code for implementing the algorithm of FIG. 11;

FIG. 13 shows a top plan view of an exemplary pad consistent with one embodiment of the invention;

DETAILED DESCRIPTION

Figure 1:
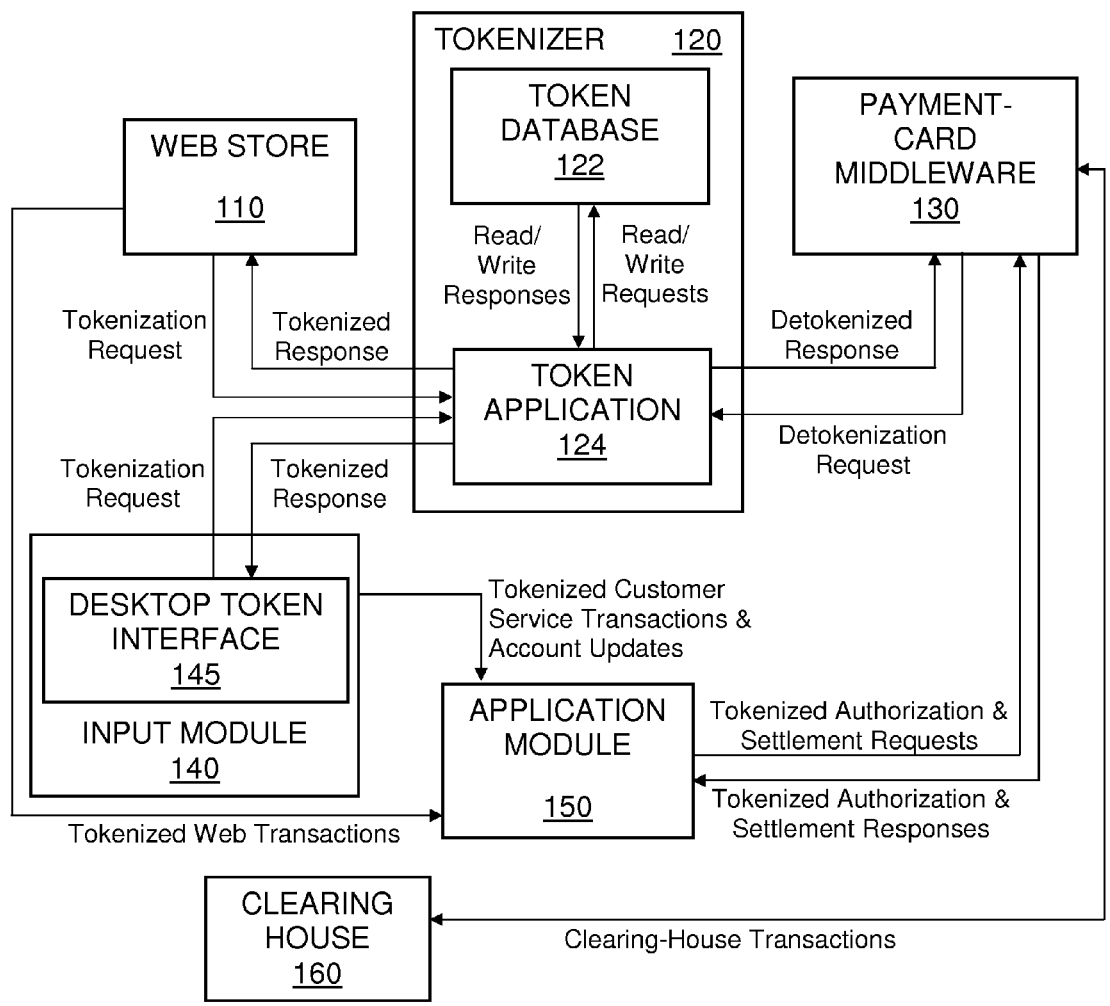
FIG. 1 is a block diagram depicting a first exemplary payment-processing system with tokenization in accordance with one embodiment of the invention.

FIG. 1 depicts a first exemplary payment-processing system 100 with tokenization, consistent with one embodiment of the invention. In this embodiment, system 100 includes a tokenizer 120, a web store 110, an input module 140, an application module 150, and payment-card middleware 130. Web store 110 is used by a purchaser to make a purchase, and input module 140 is used by a customer-service representative to enter a customer's order. Tokenizer 120 generates tokens from payment-card numbers and provides the tokens to web store 110 and input module 140. Application module 150 is a commercial enterprise system that would conventionally include payment-card numbers but instead uses tokens in place of such payment-card numbers, so that no payment-card number ever enters application module 150. Payment-card middleware 130 receives settlement requests from application module 150 in tokenized form, retrieves corresponding payment-card numbers from tokenizer 120, and forwards the settlement requests in "clear-card" form (i.e., the numeric value of the card number appearing on the physical card itself) to clearing house 160, which effects the actual payment transactions.

Whether payment-card data is entered through web store 110 or through input module 140, by tokenizing before capture, tokenizer 120 protects and isolates cardholder data by providing tokens for downstream processing, which prevents application module 150 from being subject to regulatory scrutiny.

Payment-processing system 100 is compliant with, e.g., the PCI DSS standards, which require that "in-scope" systems (i.e., systems falling within the scope of regulation of the PCI DSS standards) be isolated from the rest of the corporate network, e.g., via a firewall. The DSS standards also require that public Internet-facing web servers be isolated as well. Payment-processing system 100 therefore employs three "in-scope" network segments, or zones, for PCI purposes: (i) a web-server zone including web store 110, (ii) a customer-service zone including input module 140, and (iii) a PCI server zone including tokenizer 120 and payment-card middleware 130. Achieving and maintaining PCI compliance using these three well-defined and limited network segments and their corresponding functionality can be considerably simpler and more manageable to implement than remediating or modifying large sections of a corporate network.

Tokenizer

Tokenizer 120 includes one or more computers containing a token database 122 and a token application 124. Token database 122, may be implemented using, e.g., a simple lookup table or a more complex database system, such as Oracle Database 10g available from Oracle Corporation of Redwood City, Calif. Token database 122 contains encrypted payment-card numbers, along with a corresponding token for each encrypted payment-card number in the database.

Token application 124 encrypts payment-card numbers as they are received and generates random tokens corresponding to those payment-card numbers. In one embodiment, a payment-card number having a value of "371449635398183" might have a corresponding token with a randomly-generated alphanumeric string value of "Nc4xWKms." In another embodiment, part of the token might contain part of the payment-card number, e.g., such that the payment card type (first two digits of the payment-card number, where "37" represents American Express, "40" represents Visa, and "54" represents Mastercard) and last four digits of the card are actually part of the token itself, to assist customers and customer-service representatives in confirming or identifying, generally, the card corresponding to the token. For example, a payment-card number having a value of "371449635398183" might have a corresponding token with a value of "37-Nc4xWKms-8183," where (i) the first two digits, "37," identify the card as being of type American Express, (ii) the middle portion of the token is a randomly-generated alphanumeric string, and (iii) the last four digits, "8183," are usable to confirm the card number with the cardholder, if necessary.

Token application 124 is desirably implemented as a Java application, so that it can execute on any platform with the Java Runtime Environment (from Sun Microsystems, Inc. of Santa Clara, Calif.) installed. For most workloads (e.g., under 10 million payment-card transactions per year), token application 124 preferably executes on a machine such as the SunFire 4100 from Sun Microsystems, Inc., System x3650 from IBM Corporation of Armonk, N.Y., or Poweredge 2950 from Dell, Inc. of Round Rock, Tx.

Token application 124 interfaces with token database 122 to write information to token database 122, e.g., to write an encrypted payment-card number and corresponding newly-generated token as a new entry in token database 122. In one embodiment, a table stored in token database 122 might contain a table with entries such as the following payment-card number/token pairs:

| PAYMENT-CARD NUMBER | CORRESPONDING TOKEN |
| --- | --- |
| 371449635398183 | 37-Nc4xWKms-8183 |
| 371449635398290 | 37-waPaPcx6-8290 |
| 4012000033330232 | 40-sdkKXnO8-0232 |
| 4012000033330497 | 40-dTXeX5NN-0497 |
| 5424180279790213 | 54-9HcfZNH2-0213 |
| 5424180279790494 | 54-2CZYVkSt-0494 |

Token application 124 also interfaces with token database 122 to read information from token database 122, e.g., to retrieve a payment-card number based on a given token, or to retrieve a token for a payment-card number that has already been stored. Token application 124 further interfaces, using a secure-socket layer (SSL) protocol, with one or both of web store 110 and input module 140, e.g., to respond to a request to generate a new token or retrieve a previously-generated token from token database 122 based on a payment-card number. Token application 124 further interfaces with payment-card middleware 130, e.g., to respond to a request to retrieve a payment-card number based on a supplied token.

It is desirable that multiple instances of token application 124 execute in parallel within tokenizer 120, to provide redundancy and stability, and it is further desirable that at least two instances of token application 124 be running full-time, one in a primary location and one in a backup location (e.g., on different computers/processors). Likewise, token database 122 is desirably stored in more than a single location to provide redundancy, and tokenizer 120 may therefore include a primary database server in the primary location, which is backed up by a recovery database server in the backup location.

For interfacing with source applications, such as web sites and related applications (e.g., web store 110), tokenizer 120 employs (i) either a hyper-text transport protocol (HTTP) or secure-HTTP (HTTPS) socket interface, in conjunction with (ii) an SSL socket interface. In this scenario, tokenizer 120 uses two different APIs corresponding to these two interfaces, respectively: (i) an HTTP API, e.g., for communicating name-value pairs (e.g., MIME Type URL Form Encoded, such as "action=CE&data=1234123412341234"), and (ii) a socket API communicating in a fixed format, e.g., "FF0027CE01bbbbbbb1234123412341234," where the character "b" represents a blank. In both cases, SSL is used to encrypt the transmission. The reason for having two APIs is that the HTTP protocol uses a socket setup/teardown procedure for each transaction, whereas a socket connection is persistent across many transactions and is therefore more suitable for high-volume interactions, such as with payment-card middleware 130, which needs to detokenize many transactions in short timeframes.

A single request-response call from web store 110 sends the payment-card number in clear-card form to tokenizer 120 and receives a corresponding token from tokenizer 120 before passing the tokenized transaction along to application module 150.

Figure 2:
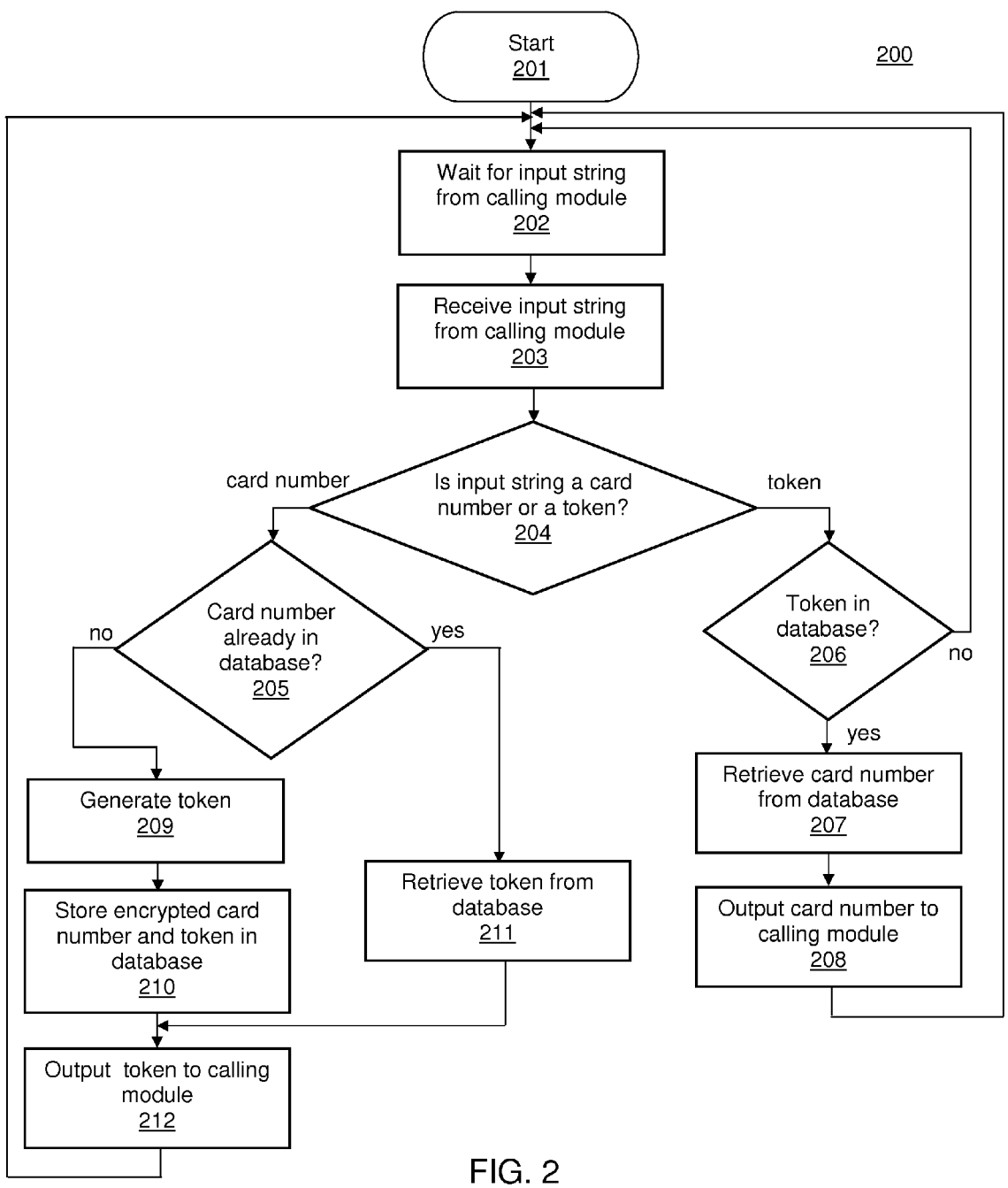
FIG. 2 is a flow chart showing an exemplary algorithm for a token application in one embodiment of the invention.

With reference now to FIG. 2, an exemplary algorithm 200 for token application 124 will now be described. The algorithm is instantiated at step 201. Next, at step 202, token application 124 waits to receive an input string from a calling module, e.g., one or more of web store 110, input module 140, and payment-card middleware 130. Next, at step 203, an input string is received from the calling module. Next, at step 204, a determination is made whether the input string is a payment-card number or a token. If, at step 204, it is determined that the input string is a payment-card number, then token application 124 proceeds to step 205. If, at step 204, it is determined that the input string is a token, then token application 124 proceeds to step 206.

At step 205, a search of token database 122 is performed to determine whether the payment-card number already exists in the database. If, at step 205, it is determined that the payment-card number does not already exist in the database, then token application 124 proceeds to step 209. If, at step 205, it is determined that the payment-card number already exists in the database, then token application 124 proceeds to step 211.

At step 209, token application 124 generates a token, which is desirably a random alphanumeric string. This alphanumeric string is not generated, in any way, based on the payment-card number and does not have any algorithmic relationship to the payment-card number. Accordingly, the token cannot be later be used to generate the payment-card number without the use of tokenizer 120.

Next, at step 210, token application 124 stores the payment-card number in encrypted form, together with the token, in token database 122. Next, at step 212, token application 124 outputs the token to the calling module and then returns to step 202.

At step 211, the token corresponding to the payment-card number is retrieved from token database 122, and then the algorithm proceeds to step 212.

At step 206, a search of token database 122 is performed to determine whether the token exists in the database. If, at step 206, it is determined that the token does not exist in the database, then token application 124 returns to step 202. If, at step 206, it is determined that the token does already exist in the database, then token application 124 proceeds to step 207. At step 207, the payment-card number corresponding to the token is retrieved from token database 122. Next, at step 208, token application 124 outputs the payment-card number to the calling module and then returns to step 202.

The PCI DSS provisions require that applications be separated from database functions. Thus, compliance with the DSS standards involves a minimum configuration of four computer systems: an application system and a database system in the primary location, along with another pair of such systems in the backup location. Because tokenizer 120 can be adapted to function properly using only generic user privileges, other payment-card applications can also be hosted on these four computer systems.

In an alternative embodiment, token application 124 is a payment-card middleware application (e.g., in lieu of payment-card middleware 130) and resides on an isolated network segment so as to be compliant with, e.g., PCI DSS requirements.

Payment-Card Number Input

Payment-processing system 100 employs two different possible sources of payment-card information: (i) public Internet-facing web sites and related applications implementing shopping card, one-time pay, or account-maintenance functions, and (ii) customer-service call centers or physical points of sale, where end customers provide cardholder data to customer-service representatives, who enter the cardholder data. Accordingly, payment-processing system 100 includes both a web store 100 and an input module 140 to achieve this functionality. In alternative embodiments, only one of web store 100 and input module 140 might be provided.

Web store 110 includes one or more computers containing an application used by an end user (e.g., a consumer making a purchase from an online web merchant) to purchase one or more goods and/or services. During the payment portion of a purchase transaction, web store 110 employs an application-programming interface (API) to transmit a payment-card number to tokenizer 120, which returns a token for web store 110 to send to application module 150 along with other transaction data.

Input module 140 includes one or more computers containing an order-taking application interface, e.g., SAP graphical user interface (SAP GUI), or other software used by a customer-service representative to enter customer data. The customer-service representative uses input module 140, e.g., to take an order by phone or in person at a physical point of sale. Input module 140 includes a desktop token interface 145, which interfaces with tokenizer 120. Desktop token interface 145 transmits a payment-card number to tokenizer 120, which returns a token for input module 140 to send to application module 150 along with other transaction data.

Input module 140 is desirably implemented in a customer-service workstation of a customer-service center. Desktop token interface 145 is an application (e.g., a Microsoft Windows applet written in the Visual Basic programming language) into which a customer-service representative manually enters a customer's payment-card number (e.g., by typing). Desktop token interface 145 uses an application-programming interface (API) to send the payment-card number in clear-card form to tokenizer 120, which encrypts and stores the payment-card number in token database 122 and returns to desktop token interface 145 a token corresponding to the card number. Desktop token interface 145 then saves the token to the Windows clipboard (although a buffer other than an operating-system clipboard could alternatively be used to achieve similar functionality in other embodiments), thus allowing a single-key or mouse-click "paste" operation to enter the token into the relevant entry-screen field within input module 140. Accordingly, with only about four additional key strokes or mouse clicks (i.e., in addition to the customer data-entry operations ordinarily being performed), a customer-service representative can use desktop token interface 145 to tokenize a payment-card number.

Figure 3:
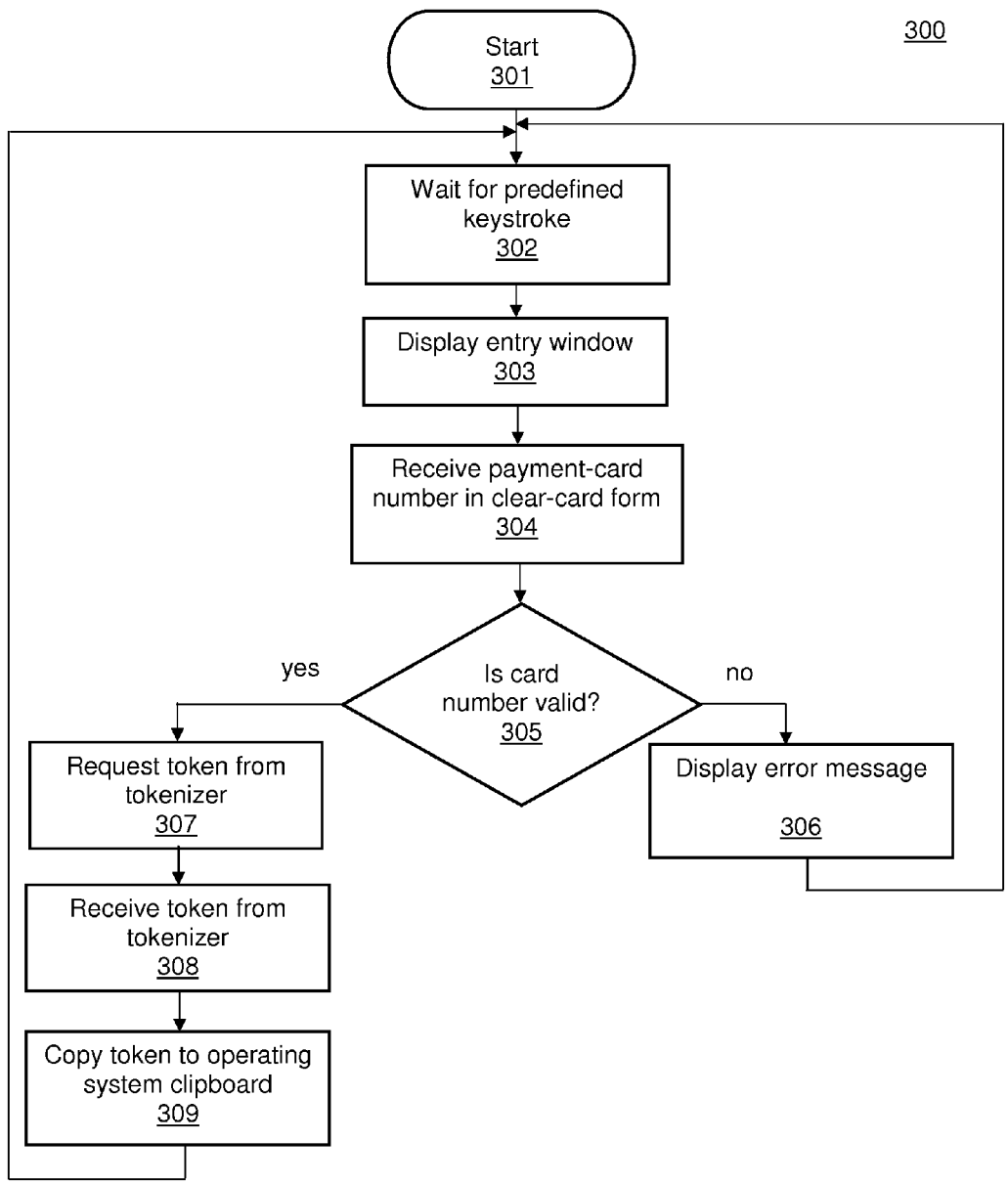
FIG. 3 is a flow chart showing an exemplary algorithm for a desktop token interface in one embodiment of the invention.

With reference now to FIG. 3, an exemplary algorithm 300 for desktop token interface 145 will now be described. At step 301, the applet is instantiated. Next, at step 302, the applet waits in the background for a predefined keystroke (e.g., ALT-F12) to be pressed. This keystroke will be pressed by a customer-service representative using the order-taking software running on input module 140 to effect a purchase of goods or services, at the moment the customer-service representative is ready to enter a customer's payment-card number. Instead of entering the payment-card number directly into the order-taking software (such that the order-taking software would be subject to regulatory compliance), the customer-service representative uses the predefined keystroke to activate the applet.

Next, at step 303, a relatively small entry window is displayed on the screen of the customer-service representative (e.g., on top of or adjacent to the order-taking software window). It is desirable that the entry window contain only a single input field. The window might also contain a clickable "submit" button. The customer-service representative types a customer's payment-card number into the input field of the entry window and presses the Enter key (or clicks the "submit" button, if one is provided).

Next, at step 304, the customer's payment-card number is received, in clear-card form, from the input field of the entry window. Next, at step 305, a determination is made whether the payment-card number entered is a valid card number using, e.g., a Luhn check (also called a Mod 10 check). If, at step 305, it is determined that the card number is invalid, then, at step 306, an error message is displayed on the screen of the customer-service representative, and the applet returns to step 302. If, at step 305, it is determined that the card number is valid, then the algorithm proceeds to step 307.

At step 307, a tokenization request containing the payment-card number is sent via an encrypted socket using the HTTPS protocol to tokenizer 120, which returns a token corresponding to the payment-card number. Next, at step 308, the token is received from tokenizer 120. Next, at step 309, the token is copied to the Windows OS clipboard. The token may also be displayed on the screen to confirm to the customer-service representative that the tokenization was successful. Following step 309, the applet returns to step 302. At this point, the token has been stored in the Windows OS clipboard.

Next, the customer-service representative changes application focus from the applet window to the order-taking software window. (It is noted that this may not be necessary in certain embodiments in which the applet closes the entry window once a token has been generated, because the application focus automatically returns to the order-taking software window upon closure of the applet's entry window.) The customer-service representative then pastes the token from the Windows OS clipboard into the payment-card number field of the order-taking software. This can be done, for example, using a sequence of mouse controls (e.g., right-click, then selecting "Paste" from a drop-down menu) or keystroke (e.g., CTRL-V). The customer-service representative then submits the order to application module 150 for processing, e.g., by pressing a "send" button on a screen of the order-taking software window.

In the foregoing manner, at no point does the payment-card number in clear-card form ever enter application module 150, and application module 150 is therefore not subject to regulatory scrutiny.

Further details are provided in FIGS. 7a-7e, which show exemplary Visual Basic program code for implementing algorithm 300 of FIG. 3.

One exemplary algorithm 300 in one embodiment of desktop token interface 145 has been described above, in which a customer-service representative manually requests a token from tokenizer 120 and then, before initiating a clearing-house transaction, manually pastes the token into a field within input module 140 that would conventionally be filled with a payment-card number in clear-card form. In an alternative embodiment that will now be described, desktop token interface 145 automatically extracts a payment-card number in clear-card form that was entered by a customer-service representative into a field within input module 140, requests a token from tokenizer 120, and replaces the clear-card form payment-card number with the token, all before initiating a clearing-house transaction.

Figure 4:
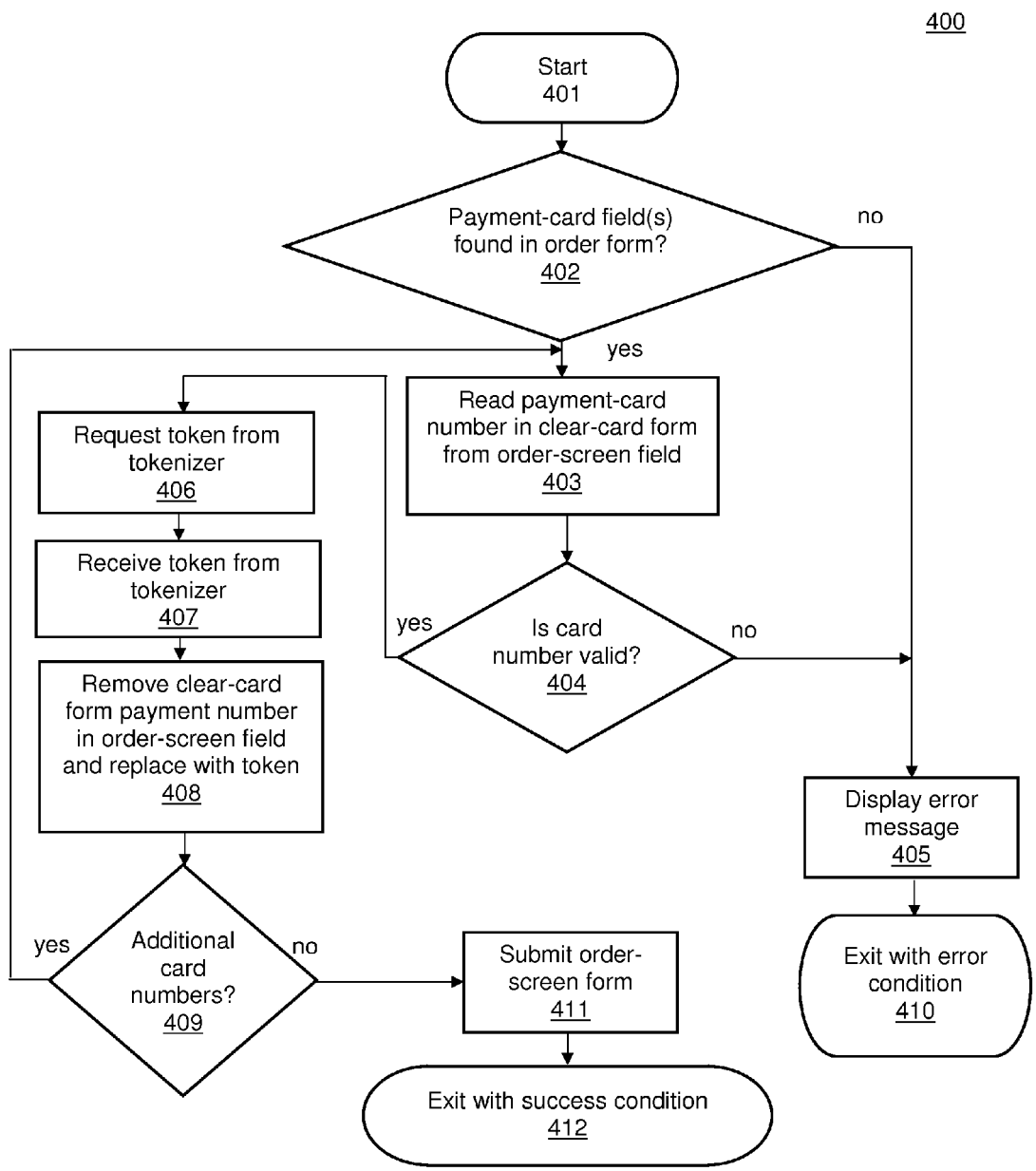
FIG. 4 is a flow chart showing an exemplary algorithm for an alternative embodiment of a desktop token interface in one embodiment of the invention.

With reference now to FIG. 4, an exemplary algorithm 400 for an alternative embodiment of desktop token interface 145 will now be described. Instead of being embodied in a Windows applet as in the case of algorithm 300, algorithm 400 is embodied in a script. For example, the SAP ERP software employs a Windows application front-end interface called SAP GUI, which provides a method for SAP customers to develop their own scripts to extend the functionality of SAP ERP. Accordingly, algorithm 400 is desirably implemented as a SAP GUI script within input module 140.

In this scenario, a customer-service representative uses the SAP GUI order-taking application interface running on input module 140 to effect a purchase of goods or services. The customer-service representative takes the customer's order and enters all of the relevant order information, including a customer's payment-card number, into a standard order screen (e.g., the VA01 Create Sales Order screen). After entering all of the information, the customer-service representative presses the "Save" icon on the standard order screen. Normally, pressing "Save" would cause all of the information on the order screen, including any payment-card numbers in clear-card form, to be submitted to an application module for processing, which would subject the application module to regulatory scrutiny. However, in this embodiment, the SAP GUI script is configured so that pressing "Save" instantiates the script that implements algorithm 400 before any information is sent to application module 150.

At step 401, the script is instantiated. Next, at step 402, the script searches all fields present on the standard order-screen form for one or more fields labeled CCNUM (or uses other criteria to locate fields that contain payment-card numbers in clear-card form) to determine whether the order-screen form contains any fields populated with payment-card numbers. If, at step 402, it is determined that the order-screen form has no fields that contain payment-card numbers in clear-card form, then the script proceeds to step 405, at which an error message is displayed on the screen of the customer-service representative, and the script subsequently exits with an error condition at step 410. If, at step 402, it is determined that the order-screen form has fields that contain payment-card numbers in clear-card form, then the script proceeds to step 403.

At step 403, the script reads the payment-card number in clear-card form from the field of the order-screen form. Next, at step 404, a determination is made whether the payment-card number entered is a valid card number using, e.g., a Luhn check (also called a Mod 10 check). If, at step 404, it is determined that the card number is invalid, then, at step 405, an error message is displayed on the screen of the customer-service representative, and the script subsequently exits with an error condition at step 410. If, at step 404, it is determined that the card number is valid, then the algorithm proceeds to step 406.

At step 406, a tokenization request containing the payment-card number is sent via an encrypted socket using the HTTPS protocol to tokenizer 120, which returns a token corresponding to the payment-card number.

Next, at step 407, the token is received from tokenizer 120. Next, at step 408, the script removes the payment-card number in clear-card form from the field of the order-screen form and replaces it with the received token.

Next, at step 409, a determination is made whether there are additional payment-card numbers on the order-screen form, in which case the script returns to step 403 to process the next payment-card number found on the order-screen form. Otherwise, the script proceeds to step 411.

At step 411, the script submits all of the information on the order-screen form, including tokens that replace the payment-card numbers in clear-card form, to application module 150. Next, at step 412, the script exits with a success condition.

If the script exits with an error condition at step 410, then the customer-service representative is taken back to the order-entry screen to make corrections, e.g., supplying a missing payment-card number or correcting an invalid payment-card number. Once appropriate correction has been made, the customer-service representative can then press "save" to retry, and algorithm 400 is once again instantiated.

In the foregoing manner, it is not necessary for the customer-service representative to manually activate an applet or paste a token into any application (as in the case of algorithm 300), and the entire tokenization process can occur seamlessly and in the background without any special knowledge or actions on the part of the customer-service representative.

Further details are provided in FIGS. 8a-8c, which show exemplary SAP GUI program code for implementing algorithm 400 of FIG. 4.

Application Module

Application module 150 is a commercial enterprise system including one or more computers containing software adapted to handle sales orders, delivery tracking, billing, account settlement, and related functionality, e.g., a system including mySAP™ Business Suite software available from SAP Americas, located in Newtown Square, Pa. Application module 150 receives from web store 110 tokenized web transactions, e.g., by means of an API capable of accessing functionality within application module 150 (such as SAP Business Application Programming Interface (BAPI)). Alternatively or additionally, application module 150 receives from input module 140 tokenized customer service transactions and account updates, e.g., by means of a universal client interface (e.g., SAP GUI) within input module 140, which is capable of accessing functionality within application module 150. Application module 150 sends tokenized requests for authorization and settlement to payment-card middleware 130 and receives from application module 150 tokenized responses to those requests, e.g., by means of a standard interface for communication with application module 150 (such as SAP Remote Function Call (RFC)).

It should be understood that application module 150 does not process, transmit, or store any PCI or PII data and is therefore not subject to regulatory scrutiny. The transactions that take place between application module 150 and web store 110 and/or input module 140 are all in tokenized form and do not include any PCI or PII data. Similarly, authorization and settlement transactions between application module 150 and payment-card middleware 130 are also in tokenized form and do not include any PCI or PII data. This scheme may be referred to as a "tokenize-before-capture" approach, whereby all front-end sources of entry for payment-card accounts (e.g., web store 110 and input module 140) are configured to tokenize the clear-card form of the payment-card number before passing the transaction along to back-end systems (e.g., application module 150) for processing.

Payment-Card Middleware

Payment-card middleware 130 includes one or more computers containing software that receives and responds to the tokenized authorization and settlement requests from application module 150, with each request including a supplied token for which the corresponding payment-card number is to be retrieved from token database 122. Payment-card middleware 130 interfaces with tokenizer 120 via an SSL interface to send requests for detokenization using the supplied token and to receive responses to those requests in the form of a payment-card number in clear-card form. Payment-card middleware 130 interfaces, e.g., via SSL or private lines, with a clearing house 160, e.g., the Automated Clearing House (ACH) payment system, to provide a clearing-house transaction request that includes the clear-card form payment-card number, for the purpose of effecting the actual payment transaction.

Payment-card middleware 130 may include card-processing software, such as PPS PayWare™ available from Princeton Payment Solutions of Princeton, N.J. Embodiments of payment-card middleware 130 may be token-aware, i.e., may be configured to distinguish automatically between tokens and payment-card numbers in clear-card form. In this manner, if a settlement request contains a payment-card number in clear-card form, then payment-card middleware 130 provides the clearing-house transaction request to clearing house 160 without using tokenizer 120. If, however, a settlement request contains a token instead of a payment-card number, then payment-card middleware 130 first uses tokenizer 120 to obtain the corresponding payment-card number prior to providing the clearing-house transaction request to clearing house 160. Accordingly, payment-card middleware 130 can be used as middleware for processing both tokenized transactions and non-tokenized transactions (e.g., from applications other than application module 150).

Bulk Data Migration

In addition to having utility for payment-card data entry and processing at a point of sale, embodiments of payment-processing system 100 can also be used to migrate bulk cardholder data stored in commercial enterprise system tables (e.g., the SAP BSEGC or FPLTC tables) to tokenizer 120. In this scenario, one or more modules of tokenizer 120 (e.g., payment-card middleware 130) are provided with software to effect such data migration. Migration is desirably performed while no active payment transactions are taking place (to avoid locked payment-card entries in the source table), but this is not a requirement, and the migration routine can be performed one or more additional times to ensure the migration of table entries locked during previous runs of the migration routine. If payment-card middleware 130 is configured to distinguish automatically between tokens and payment-card numbers in clear-card form and automatically return one when the other is supplied, as described above, then a migration to tokens can be performed with minimal commercial enterprise system downtime.

Packet Inspector

Figure 5:
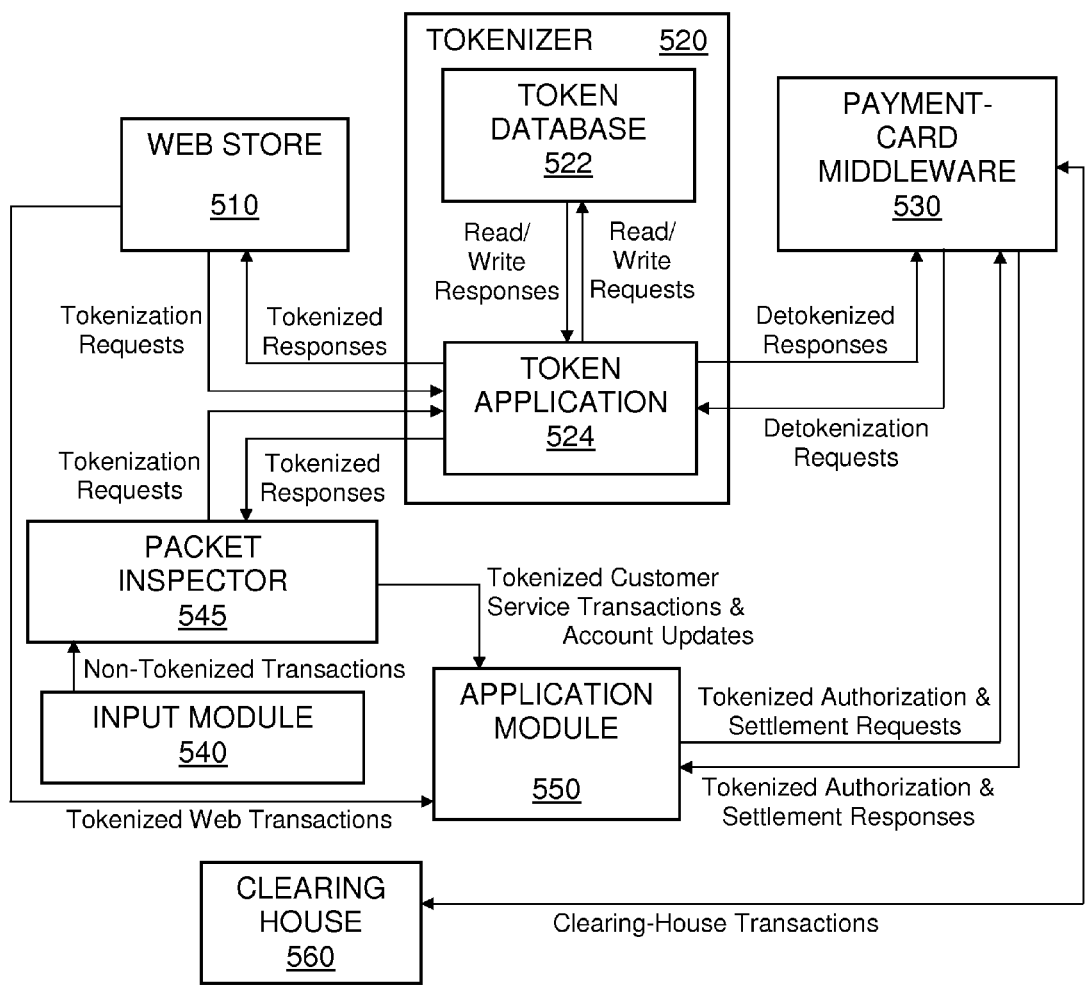
FIG. 5 is a block diagram depicting a second exemplary payment-processing system with tokenization in accordance with one embodiment of the invention.
Figure 6:
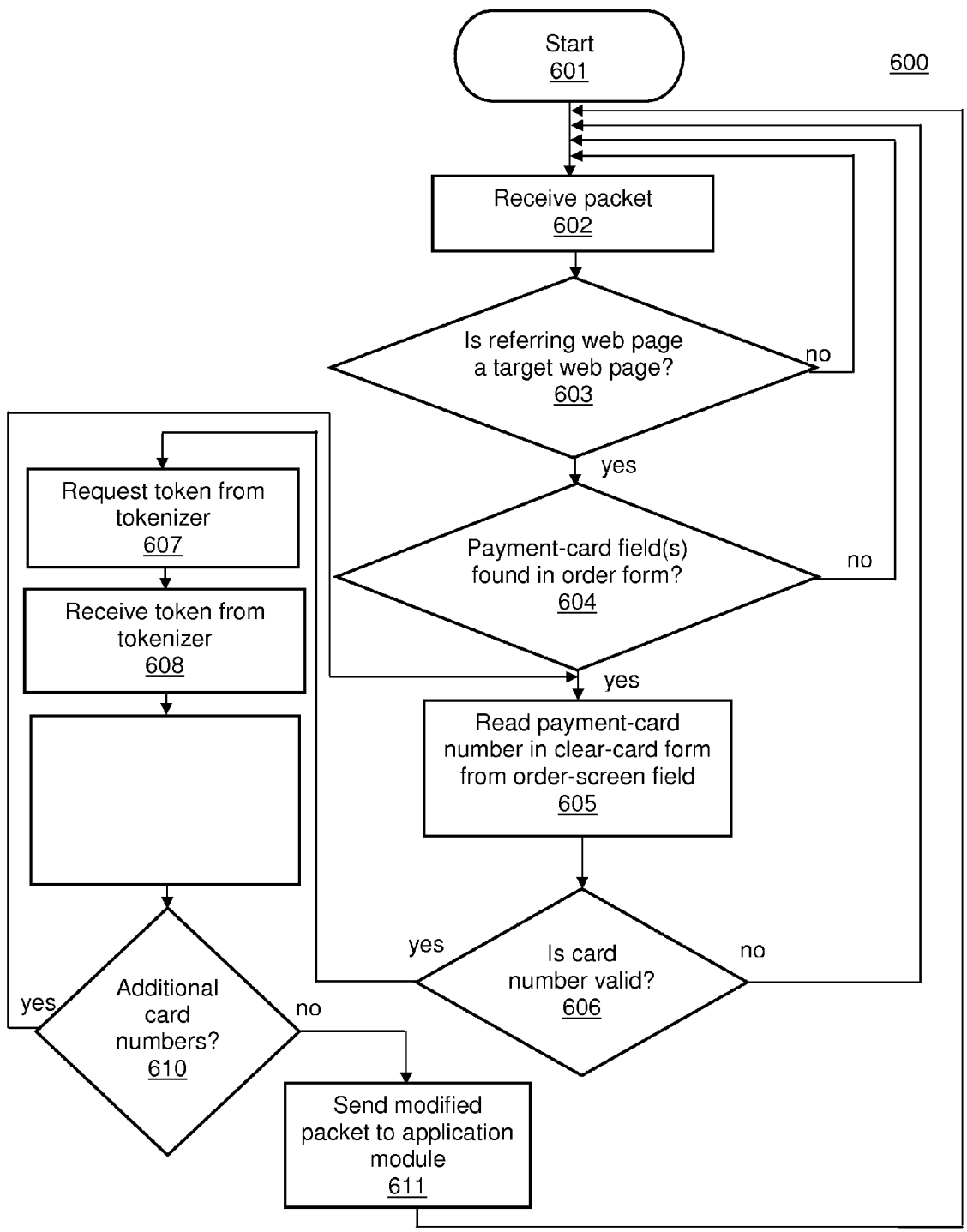
FIG. 6 is a flow chart showing an exemplary algorithm for a packet inspector in one embodiment of the invention.

With reference now to FIGS. 5 and 6, a second exemplary payment-processing system 500 consistent with one embodiment of the invention will now be described. Payment-processing system 500 is similar to payment-processing system 100, except as described below.

FIG. 5 depicts payment-processing system 500 with tokenization, consistent with one embodiment of the invention. As shown in FIG. 5, instead of employing a desktop token interface, payment-processing system 500 initiates tokenization using a packet inspector 545, e.g., the BIG-IP™ Local Traffic Manager or BIG-IP™ Global Traffic Manager, both available from F5 Networks, Inc. of Seattle, Wash. In payment-processing system 500, all packets (e.g., TCP/IP packets) from input module 540 pass through packet inspector 545 prior to being forwarded to application module 550. Packet inspector 545 is adapted to modify the contents of certain packets prior to forwarding them, as will be now described in further detail.

Packet inspector 545 receives packets containing transactions in non-tokenized form from input module 540, inspects each incoming packet for payment-card numbers in clear-card form, and tokenizes those payment-card numbers prior to passing the packet along to application module 550. Packet inspector 545 tokenizes the payment-card numbers by sending the payment-card numbers in clear-card form to tokenizer 520, which encrypts and stores the payment-card numbers in token database 522 and returns to packet inspector 545 a token corresponding to the card number. Packet inspector 545 replaces the clear-card form payment-card numbers found in packets passing through packet inspector 545 with tokens prior to sending those packets to application module 550, so that packets containing transactions that are sent to application module 550 contain only tokenized transactions.

With reference now to FIG. 6, an exemplary algorithm 600 for packet inspector 545 will now be described. Algorithm 600 is desirably embodied in a script running on packet inspector 545, e.g., a tool command language (TCL) script used in conjunction with the BIG-IP product series from F5 Networks, Inc. TCL scripts have access to all traffic passing through packet inspector 545 and have the ability to inspect and alter any data passing through packet inspector 545.

At step 601, the script is instantiated. Next, at step 602, a packet arriving at packet inspector 545 is received. Next, at step 603, the script inspects the packet to determine whether the referring page from which the packet originated is a "target" web page, which is a web page that is known or expected to request a payment-card number from a customer-service representative. This is done by comparing the Referrer field (which indicates the web page from which the packet originated) in the HTTP header with a list of known target web pages. If, at step 603, it is determined that the packet is not from a target web page, then the script returns to step 602 to receive the next packet. If, at step 603, it is determined that the packet is from a target web page, then the script proceeds to step 604. At step 604, the script inspects the packet to determine whether a field named CCNUM exists (or uses other criteria to locate fields that contain payment-card numbers in clear-card form), the presence of which indicates that the packet contains at least one field populated with a payment-card number. If, at step 604, it is determined that the packet has no fields that contain payment-card numbers in clear-card form, then the script returns to step 602 to receive the next packet. If, at step 604, it is determined that the packet has fields that contain payment-card numbers in clear-card form, then the script proceeds to step 605.

At step 605, the script reads the payment-card number in clear-card form from the field of the packet. Next, at step 606, a determination is made whether the payment-card number is a valid card number using, e.g., a Luhn check (also called a Mod 10 check). If, at step 606, it is determined that the card number is invalid, then there is no actual card number that needs to be tokenized, and the script returns to step 602 to receive the next packet. If, at step 606, it is determined that the card number is valid, then, at step 607, a tokenization request containing the payment-card number is sent via an encrypted socket using the HTTPS protocol to tokenizer 520, which returns a token corresponding to the payment-card number.

Next, at step 608, the token is received from tokenizer 520. Next, at step 609, the script removes the payment-card number in clear-card form from the field of the packet and replaces it with the received token.

Next, at step 610, a determination is made whether there are additional payment-card numbers in the packet, in which case the script returns to step 605 to process the next payment-card number found in the packet. Otherwise, the script proceeds to step 611.

At step 611, the modified packet, including tokens that replace the payment-card numbers in clear-card form, is sent to application module 150, after which the script returns to step 602.

Further details are provided in FIGS. 9a-9c, which show exemplary TCL program code for implementing algorithm 600 of FIG. 6.

Browser-Based Embodiments

There are two principal ways in which browser-based embodiments of the present invention are used. In some browser-based embodiments, online merchants take orders from customers who use a web browser to enter order and payment information on merchant web pages at the merchants' web sites. In other browser-based embodiments, online merchants employ customer-service representatives who take customers' orders by phone or in person and use a web browser to enter, on merchant web pages, order and payment information provided by the customers.

As discussed above, the PCI DSS standards impose certain requirements on merchants who "process, store, or transmit" credit card information. These requirements, while important to protect credit card information from loss or theft, impose significant burdens upon merchants and their IT staff. Methods that can reduce or eliminate credit-card data from the Merchant IT environment have a significant impact on IT Staff allocation and IT costs. Numerous companies operate facilities to offload credit-card processing, and the associated compliance tasks and costs, from merchants.

Web browsers are subject to viruses and other malware, and a significant defense against these attacks is the "same origin" policy, which requires that all components of a web page, including any response, must originate or terminate at the same URL (protocol, host and port). This policy prevents a web page from originating at one URL and sending the response to a different URL. The effect of this policy has conventionally been to require a merchant's order entry web page containing credit card data to be sent through the merchant's own web servers, even if the merchant has outsourced card-payment operations to another provider, which causes the merchant to remain "in scope" for purposes of DSS requirements.

Figure 10:
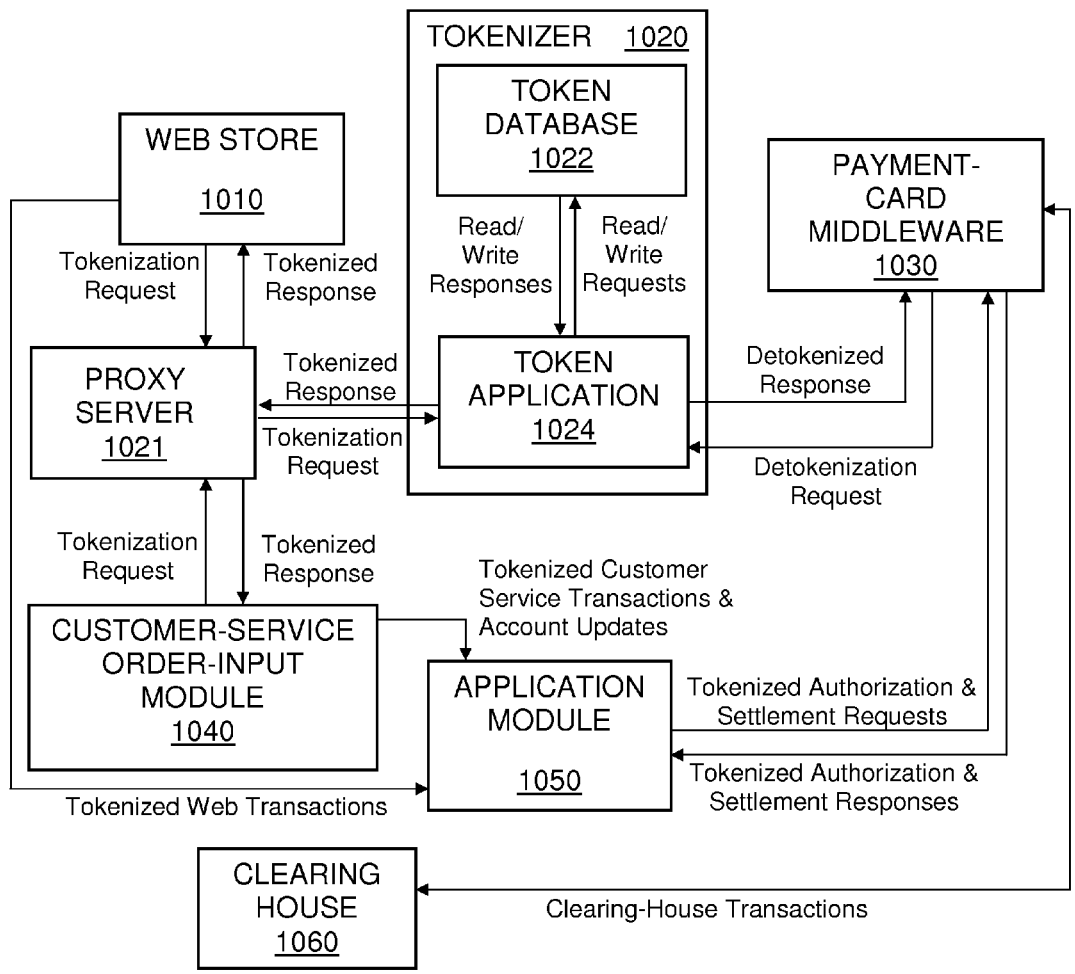
FIG. 10 is a block diagram depicting a browser-based third exemplary payment-processing system with tokenization in accordance with one embodiment of the invention.
Figure 11:
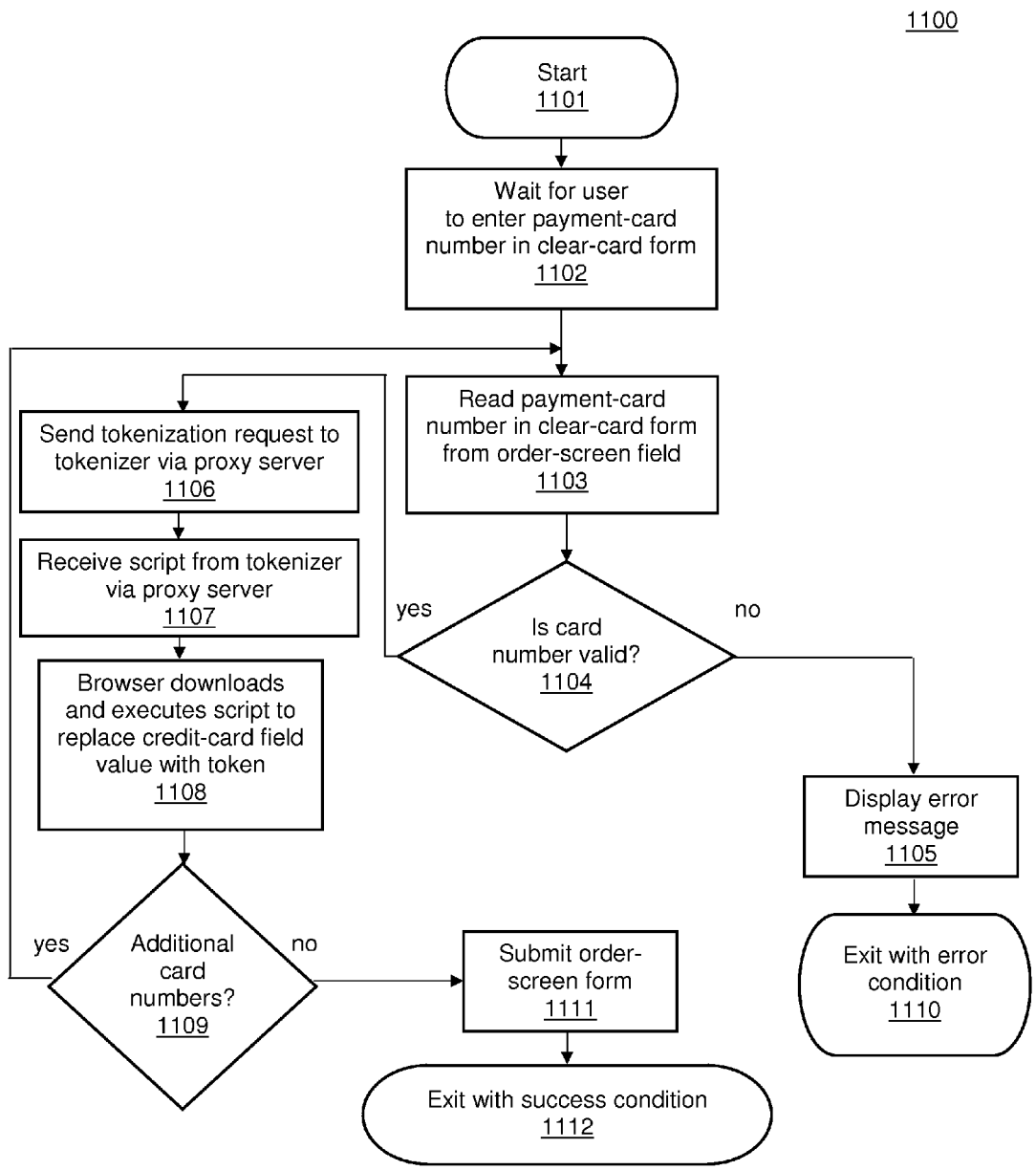
FIG. 11 is a flow chart showing an exemplary algorithm for browser-based tokenization in one embodiment of the invention.

With reference now to FIGS. 10-12, a third, browser-based exemplary payment-processing system 1000 consistent with one embodiment of the invention will now be described. Payment-processing system 1000 is similar to payment-processing system 100, except as described below.

FIG. 10 depicts browser-based payment-processing system 1000 with tokenization, consistent with one embodiment of the invention. In this embodiment, orders are taken either by a customer-service representative using customer-service order-input module 1040 or directly from a customer via web store 1010. As shown in FIG. 10, instead of initiating the tokenization process via a desktop token interface or packet-inspection scheme, payment-processing system 1000 initiates tokenization using a proxy server 1021. Proxy server 1021 forwards to token application 1024 packets containing tokenization requests originating from customer-service input module 1040 and web store 1010, and proxy server 1021 also forwards tokenized responses sent back to customer-service input module 1040 and web store 1010 from token application 1024. Although not shown in FIG. 10, in certain embodiments, (i) tokenizer 1020, payment-card middleware 1030, and proxy server 1021 all reside behind a single firewall at a payment-processing facility, (ii) customer-service input module 1040 and web store 1010 also reside behind one or more firewalls, e.g., at customer premises, and (iii) token database 1022 resides in a secure zone and is accessible only to token application 1024 (e.g., via port 3306).

To overcome the restrictions caused by the "same origin" policy mentioned above, certain embodiments of the invention take advantage of one resource that is exempt from the "same origin" policy, namely, web page scripts. Normally written in JavaScript, these functions are not source-restricted by the browser, and thus any arbitrary web page can reference one or more scripts from any other arbitrary URL. Further, it is possible for a script to contain data, if such data is properly formatted. This technique will be referred to as the "JavaScript Object Notation" (JSON) technique.

The JSON technique provides a means for a client browser, when processing an order entry web page sourced from a merchant site, to obtain a credit card token from an arbitrary third party site and to send the credit card token (rather than the payment information itself) to the merchant site. By removing the credit card number from the order data the merchant receives, the merchant is no longer "processing, transmitting, or storing" credit card data and thus is no longer subject to compliance with the DSS requirements.

In certain embodiments of the invention, a merchant order-entry web page is coded with a function similar to the getToken( ) function provided in FIG. 12, which shows exemplary JavaScript program code for implementing algorithm 1100 of FIG. 11.

As shown in FIG. 11, at step 1101, the script is instantiated. Next, at step 1102, the script waits for tokenization to be initiated by the user interacting with an appropriate user-interface element within the order-entry web page (e.g., a user pressing ENTER or TAB after typing a payment-card number in clear-card form, or a user clicking OK after entering complete order information).

At step 1103, the script searches all fields present on the standard order-screen form for one or more fields labeled CCNUM (or uses other criteria to locate fields that contain payment-card numbers in clear-card form) to locate fields populated with payment-card numbers and reads the payment-card number in clear-card form from one or more fields of the order-screen form.

At step 1104, a determination is made whether the payment-card number entered is a valid card number using, e.g., a Luhn check (also called a Mod 10 check). If, at step 1104, it is determined that the card number is invalid, then, at step 1105, an error message is displayed on the screen of the customer-service representative, and the script subsequently exits with an error condition at step 1110. If, at step 1104, it is determined that the card number is valid, then the algorithm proceeds to step 1106.

At step 1106, a JSON request (containing the payment-card number) to receive a tokenized script is sent via an encrypted socket using the HTTPS protocol to proxy server 1021, which forwards the request (e.g., via HTTPS port 8443) to tokenizer 1020. At step 1107, tokenizer 1020 returns, via proxy server 1021, a tokenized response in the form of a script containing a token that corresponds to the payment-card number. One example of a tokenized response to a JSON request might be:

processToken({"action":"CE", "data":"12-NA8Ab9kS-1234"}), where 12-NA8Ab9kS-1234 is the returned token.

At step 1108, the tokenized response is then downloaded by the browser and executed. If the downloaded script includes data and calls a function, then the data can be assigned by the called function to existing variables in the form to be returned to the merchant site. In this manner, the browser can send the credit card number to tokenizer 1020, tokenizer 1020 can return a token to the browser in the form of a function call argument, and the browser will then replace the order-entry credit-card field value with the token.

Next, at step 1109, a determination is made whether there are additional payment-card numbers on the order-screen form, in which case the script returns to step 1103 to process the next payment-card number found on the order-screen form. Otherwise, the script proceeds to step 1111.

At step 1111, the script submits all of the information on the order-screen form, including tokens that replace the payment-card numbers in clear-card form, to application module 1050. Next, at step 1112, the script exits with a success condition.

If the script exits with an error condition at step 1110, then the customer-service representative or web customer is taken back to the order-entry screen to make corrections, e.g., supplying a missing payment-card number or correcting an invalid payment-card number. Once appropriate correction has been made, the customer-service representative or customer can then click "OK" to retry, and algorithm 1100 is once again instantiated.

In the foregoing manner, it is not necessary for the customer-service representative or customer to manually activate an applet or paste a token into any application (as in the case of algorithm 300), and the entire tokenization process can occur seamlessly and in the background without any special knowledge or actions on the part of the customer-service representative or customer placing a web order.

It should be understood that, in certain embodiments, payment-card middleware 1030 is configured to receive and forward to clearing house 1060, along with tokenized payment-card numbers, CVV ("Card Verification Value") or CVV2 (second-generation algorithm CVV) numbers. Such codes are typically 3-digit codes printed (but not magnetically encoded) on VISA-, MasterCard- and Discover-branded credit and debit cards, and 4-digit codes printed (but not magnetically encoded) on American Express-branded credit and debit cards. CVV2 numbers, which are also known as Card Security Code (CSC) numbers, employ a second-generation algorithm that makes the CVV2 numbers difficult for a thief to guess. Supplying the CVV2 code in a transaction is intended to verify that the customer has the card in their possession. Knowledge of the code proves that the customer has seen the card, or has seen a record made by somebody who saw the card.

PIN-Pad-Based Embodiments

In certain embodiments of the invention, a hardware device, which will be referred to herein as a "pad" or "entry device" can be used for manual entry of payment-card information, to limit the impact of the DSS standards. In one embodiment, the pad is a modified conventional "PIN-pad" device normally used at a point-of-sale (POS) terminal to process credit card payments.

A pad consistent with embodiments of the invention may have particular utility, e.g., in mail or telephone order-processing environments where payment card data (typically, primary account number (PAN), expiration date, CVV2, cardholder name, and the like) is received either by telephone, paper mail, or fax, and then manually entered into a merchant's order-processing system by a customer-service representative. In this scenario, the customer-service representative typically uses a desktop computer that runs a data-entry software application into which order and payment details are entered and then transmitted to a main order-processing system. Because this desktop computer has knowledge of the payment card details, even if only for a few seconds, the desktop computer is considered to be subject to all of the PCI DSS requirements.

For many merchants, it is not practical or even possible to subject such a desktop computer to DSS requirements. Merchants might have substantial part-time staff to handle peak-hour order-taking. Merchants might have a large number of employees who handle orders for only very short periods of time, perhaps an hour a day or less. These employees might be scattered throughout a merchant's plurality of physical locations. Accordingly, merely identifying the computers that are subject to DSS requirements can be a challenge. Further, the DSS requirements dictate that any computer that processes, stores, or transmits a payment card number is "in scope," and any computer on the same network as an in-scope computer is also in scope. In order to comply with DSS requirements, a merchant might be forced to make sure that every computer that the merchant owns is compliant, which can be a cost-prohibitive or difficult task.

To address the foregoing problems, the Payment Card Industry employs a scheme known as Point-to-Point Encryption (P2PE). In a P2PE scheme, if a merchant can show that the payment card data was encrypted at a "point of interaction," and that no computer other than the payment-card-processing server has access to the encryption keys, then the rest of the merchant environment is considered out of scope.

This arrangement relaxes merchant requirements substantially. For "card-present" environments, the merchant swipes a customer's card in one of the ubiquitous payment-card terminals. The terminal encrypts the relevant information and sends it to the register, which combines it with other information and forwards all of the information to a clearing house or the like to effect payment-card processing. In this scenario, neither the register nor any other computer in the merchant network has the keys for decrypting the payment-card number. Since the payment-card information is encrypted at its "point of interaction," and no computer other than the card-processing server can access the encryption keys, other computers in the merchant environment are not "in scope."

For "card-not-present" environments, processing is somewhat different. A human actor types the card number into a keypad 1303 of a device, such as pad 1300 of FIG. 13 (which shows a top plan view of one embodiment of pad 1300) and FIG. 14 (which shows pad 1300 as part of a larger system 1400). The payment-card industry requires that all devices that accept Personal Identification Numbers (PINs) be certified as complying with the PIN-entry device (PED) requirements of the DSS standards. In one embodiment, pad 1300 is a standard PIN-pad that has been modified to accept a full 19-digit primary account number in lieu of a conventional 4-digit PIN number and to encrypt that value in the same way it would have encrypted a PIN number, as will be described in further detail below. This allows pad 1300 to qualify as a point of interaction for purposes of the aforementioned P2PE exception to the DSS standards.

In one embodiment, pad 1300 is a combination hardware/software add-on product to a payment-card encryption and tokenization system (e.g., as described above with reference to FIGS. 1-9c). In this embodiment, pad 1300 is a secure PIN-entry device that has been certified by the Payment Card Industry Security Standards Council as meeting all the of security requirements for PIN-entry devices. Pad 1300 is constructed by modifying the firmware of a conventional off-the-shelf PIN-entry device to accept a longer string of numbers that consists of or represents a primary account number. For example, pad 1300 may be a modified off-the-shelf PIN-entry device (PED), as manufactured by, e.g., IdTech (using the SmartPIN Application Programming Interface (API)), Verifone, Hypercom, and the like. The manufacturer of the PED device pre-loads a Base Derivation Key (BDK) to into each PED device that is intended for use as pad 1300. The manufacturer also installs a modified version of its firmware to support 19-digit values in the PIN field, which would otherwise normally support only 4-digit values.

A unique BDK key may be assigned for each instantiation of pad 1300 (or, alternatively, a unique BDK key may be assigned for each different merchant), so that each pad 1300 (or merchant) can be uniquely identified.

Figure 14:
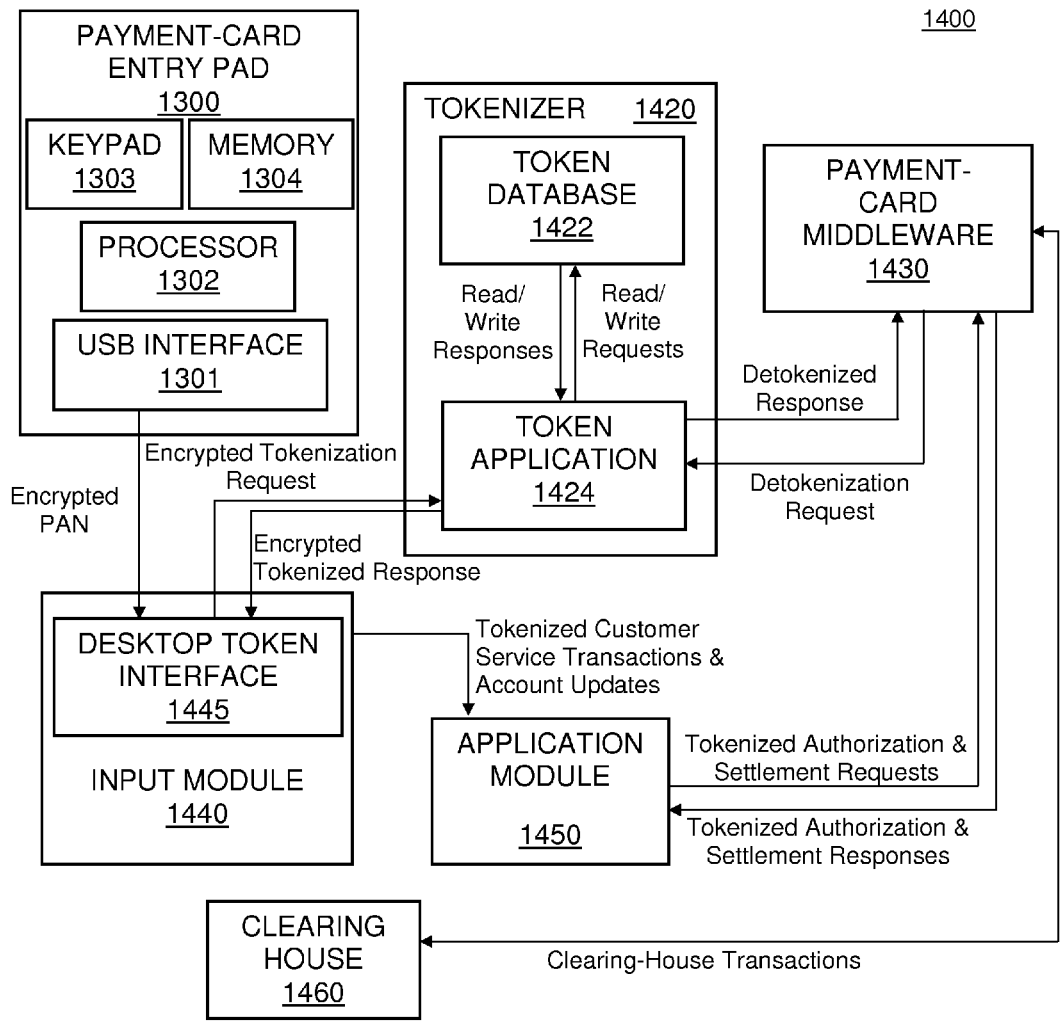
FIG. 14 is a block diagram depicting a PIN-pad-based fourth exemplary payment-processing system with tokenization in accordance with one embodiment of the invention.

Turning now to FIG. 14, pad 1300 includes a Universal Serial Bus (USB) interface 1301, a processor 1302, keypad 1303, and memory 1304. USB interface 1301 is desirably connected via a USB cable to a respective USB interface of a customer-service representative's desktop computer running an operating system, such as Microsoft Windows, and running an input module 1440, which is used by a customer-service representative to enter a customer's order. Input module 1440 includes a desktop token interface 1445, similar to that illustrated in FIGS. 3 and 4, which communicates with both pad 1300 and tokenizer 1420. Desktop token interface 1445 sends encrypted data to tokenizer 1420, and the encryption keys used to encrypt that data are known only to pad 1300 and tokenizer 1420. Since desktop token interface 1445 has no access to the encryption keys used by pad 1300 or tokenizer 1420, desktop token interface 1445 has no access to any cardholder data entered via pad 1300 and is not considered to be "in scope."

Pad 1300 contains appropriate software, executed by processor 1302, for communicating with desktop token interface 1445 and performing certain functions using instructions stored in memory 1304 (e.g., firmware), to perform the following functions. Pad 1300 receives a payment-card number (or "primary account number" (PAN)) from a customer-service representative who manually enters the PAN into keypad 1303 and presses the "OK" (or "Enter") button when done. Pad 1300 encrypts the PAN into the same field that would normally contain a 4-digit PIN. Pad 1300 then sends the encrypted data via USB to desktop token interface 1445, which reads the encrypted data from pad 1300 and forwards the encrypted data, via an encrypted HTTPS call, to tokenizer 1420. Tokenizer 1420 receives and decrypts the data and searches its database 1422 to see if a token for this data already exists. If a token is found, then tokenizer 1420 returns the token to desktop token interface 1445, which is configured to buffer the token in the operating-system clipboard, as described above with respect to step 309 of FIG. 3. If a token is not found, then tokenizer 1420 re-encrypts the data for storage, generates and stores in database 1422 a new random token corresponding to the payment-card number, and returns the token.

With the token in the operating-system clipboard, the token can be pasted into order-taking software running on input module 1440 in lieu of a clear-card form payment-card number. Since the token is not subject to the DSS requirements, the order-taking software is not considered "in scope."

Figure 15:
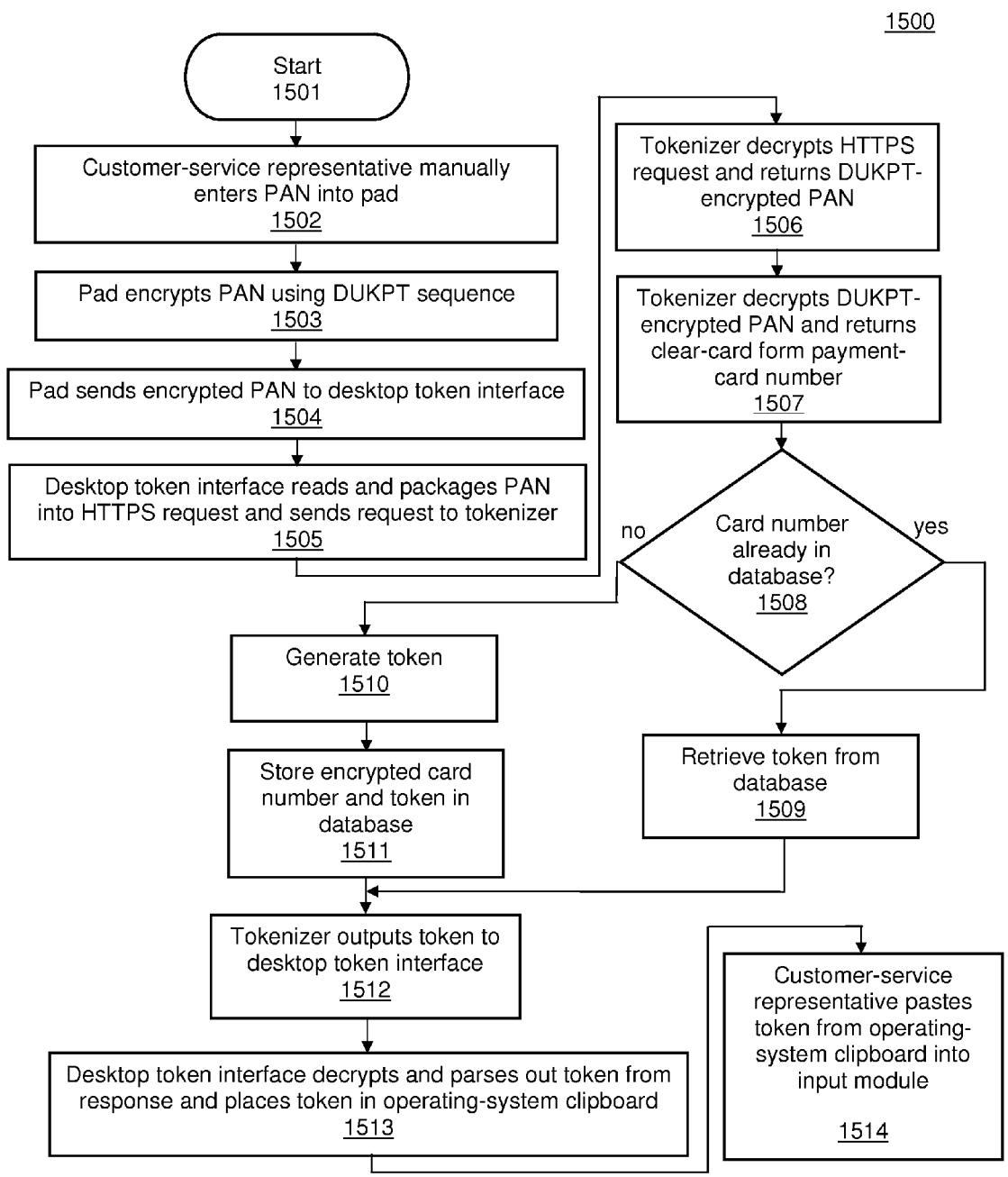
FIG. 15 is a flow chart showing an exemplary algorithm for PIN-pad-based tokenization in one embodiment of the invention.

With reference now to FIG. 15, an exemplary algorithm 1500 for desktop token interface 1445 will now be described. Algorithm 1500 can be embodied, e.g., in a script, such as a SAP GUI script within input module 1140, in an applet, or the like.

At step 1501, the script is instantiated. Next, at step 1502, a customer-service representative manually enters a PAN into keypad 1303 of pad 1300. At step 1503, pad 1300 encrypts the PAN, e.g., using the next available future key in a Derived Unique Key Per Transaction (DUKPT) sequence, which is a key-management scheme in which, for every transaction, a unique key is used, with the unique key being derived from a fixed key. The DUKPT process defines a Key Sequence Number that is combined with the BDK to create, for each transaction, a transaction-specific encryption key. In this embodiment, the fixed key is the BDK key that was pre-loaded by the manufacturer. Next, at step 1504, pad 1300 sends a tokenization request, including the encrypted PAN, to desktop token interface 1445 via USB interface 1301.

At step 1505, desktop token interface 1445 reads and packages the encrypted data into an HTTPS request (i.e., SSL-encrypted HTTP request) and sends the HTTPS request to tokenizer 1420. (It should be understood that, in alternative embodiments, instead of desktop token interface 1445 performing this function, additional software could be included within pad 1300 so that pad 1300 can perform this function.)

Next, at step 1506, tokenizer 1420 decrypts the HTTPS request, which operation returns a DUKPT-encrypted PAN. At step 1507, tokenizer 1420 decrypts the DUKPT-encrypted PAN, which operation returns the original payment-card number in clear-card form.

At step 1508, a search of token database 1422 is performed to determine whether the payment-card number already exists in the database. If, at step 1508, it is determined that the payment-card number already exists in the database, then token application 1424 proceeds to step 1509. If, at step 1508, it is determined that the payment-card number does not already exist in the database, then token application 1424 proceeds to step 1510.

At step 1509, the token corresponding to the payment-card number is retrieved from token database 1422, and then the algorithm proceeds to step 1512.

At step 1510, token application 1424 generates a token, which is desirably a random alphanumeric string. This alphanumeric string is not generated, in any way, based on the payment-card number and does not have any algorithmic relationship to the payment-card number. Accordingly, the token cannot be later be used to generate the payment-card number without the use of tokenizer 1420.

Next, at step 1511, token application 1424 stores the payment-card number in encrypted form, together with the token, in token database 1422. At step 1512, token application 1424 outputs, to the desktop token interface, an encrypted (HTTPS) response containing the token.

Next, at step 1513, desktop token interface 1445 decrypts the HTTPS response, parses out the token from the response, and buffers the token in the operating-system clipboard. Finally, at step 1514, the customer-service representative pastes the token from the operating-system clipboard into input module 1440, e.g., using a sequence of mouse controls (e.g., right-click, then selecting "Paste" from a drop-down menu) or keystroke (e.g., CTRL-V).

In the foregoing manner, at no point does the payment-card number in clear-card form ever enter input module 1450 or application module 1450, and those components are therefore not considered to be "in scope."

Alternative Embodiments and Variations

It should be understood that various changes in the details, materials, and arrangements of the parts which have been described and illustrated in order to explain the nature of this invention may be made by those skilled in the art without departing from the scope of the invention as expressed herein.

For example, it should be understood that the inventive concepts of embodiments of the invention may be applied not only in payment-processing systems as described above but also in any other systems involving the use of confidential information.

Accordingly, although the embodiments described herein are generally in the context of a payment-processing system that uses tokens as a substitute for payment-card numbers, it should be understood that the present invention includes the use of tokens as substitutes for other information desirably kept separate from one or more applications, even outside the context of payment-processing systems, e.g., medical records management systems, age-verification systems that use driver's licenses, etc. Such information can include payment-card numbers and other payment-related information, e.g., bank account numbers, credit or debit card numbers, security codes, access codes, and passwords, as well as other identifying information, e.g., first and/or last names, social security numbers, driver's license numbers, government-issued or school-issued identification numbers, biometric records, birth dates and places, mother's maiden name, etc., and it should be understood that the term "confidential information" as used herein encompasses all of the foregoing, as well as other information desirably kept separate from one or more applications, computers, or computer systems. Likewise, the term "transaction" should be understood as encompassing all transactions that employ confidential information, including, e.g., medical-insurance transactions (such as might be used by a medical provider to bill a patient's insurance company), age-verification transactions (such as might be used to verify the age of a patron ordering alcoholic beverages using a driver's license), transactions for identifying individuals (such as social security number verification systems), and the like.

Conventionally, when encryption is used to protect data representing confidential information, the resulting encrypted string or number is often larger than the data representing the original confidential information. In the case of ERP applications that restrict the size and/or type of data, such as a social security number, to a predetermined format, the process of encryption can result in a value larger that the field allotted, thereby making it difficult or impossible to re-introduce the encrypted value back into the original field. However, because a tokenizer consistent with embodiments of the invention uses tokens having a predefined format as a substitution for confidential information, tokens can be generated that conform with a predefined field length or type. For example, if the confidential information being tokenized is a social security number, which is limited to 9 numeric characters, then a random token having 9 numeric characters can be generated in place of an actual social security number, so that the token can be used in the original social security number field. Thus, using tokens in embodiments of the invention permits a predefined and formatted value substitution with conventional software applications, while exempting those software applications from regulatory scrutiny.

It should be understood that the term "random," as used herein, should not be construed as being limited to pure random selections or pure random character and/or number generations, but should be understood to include pseudo-randomly-generated alphanumeric strings, including seed-based selections or alphanumeric generations, as well as other selection or character/number generation methods that might simulate randomness but are not purely random. A hashing function might be used in embodiments of the present invention, and such hashing function may be based on random numbers, non-random numbers, or combinations of random and non-random numbers, provided that the hashing function is not based on confidential information itself. The term "random" should also be construed as including other non-random alphanumeric sequences, provided that such sequences have no algorithmic relationship with any confidential information to which such sequences correspond.

The term "packet inspector" as used herein refers to any combination of hardware and/or software used to receive packets of data, examine the contents of those packets, selectively modify the contents of those packets, and forward those packets to other hardware and/or software systems for further processing. In certain embodiments, a packet inspector is implemented purely in software and may reside on a general-purpose computer (e.g., the same computer as input module 540) or other computing device, and in other embodiments, a packet inspector may be a separate, dedicated hardware packet-inspection appliance. A packet inspector as used in embodiments of the invention may also include other functionality, e.g., load-balancing or fail-over protection.

As used herein, the term "module" refers to any of an application-specific integrated circuit (ASIC), an electronic circuit, a processor (shared, dedicated, or group) that executes one or more software or firmware programs, a combinational logic circuit, and/or other suitable components that provide the described functionality The terms "PIN-entry device," "PED," and "entry device" refer to any hardware device adapted to encrypt confidential information, such as payment-card numbers, and provide the encrypted data via a communications interface to a computer, which forwards that encrypted data to a tokenizer that will return a token having no algorithmic relationship to the confidential information. Such devices can include dedicated hardware devices, e.g., modified PIN-entry devices (as would normally be used to encrypt 4-digit PIN numbers for use as security codes with credit or debit cards) that can encrypt up to 19-digit card numbers, as described herein. Such devices can also include other devices that perform the same functionality, e.g., general-purpose computers running appropriate hardware and software to perform some or all of the pad functionality shown in FIGS. 13-15 herein and described above.

An entry device consistent with embodiments of the invention can be coupled to its respective computer by USB or other wired or short-range or long-range wireless interface, including, e.g., Bluetooth, WiFi, Ethernet, a wireless telephonic network, or the like.

Although embodiments are described herein that employ HTTPS transport for encryption, secure-shell (SSH) port forwarding could alternatively be used to create an encrypted transport (or channel) in a similar manner, i.e., causing a port from one host to appear on another, using a connection through SSH through which traffic to the forwarded port is encrypted. In one embodiment, port forwarding occurs in two directions. First, the customer-service representative or customer initiates an SSH tunnel when requesting a token via the proxy server, thereby allowing a reverse connection from the proxy server to a single host and/or port at the customer-service order-input module or web store. Second, payment-card middleware opens a connection to a local SSH port, which is forwarded to the application module so that the application module can interface with the tokenizer to send requests for detokenization using supplied tokens.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing embodiments of the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing embodiments of the invention. When implemented on a general-purpose processor, the program code segments combine with the processor to provide a unique device that operates analogously to specific logic circuits.

The present invention can also be embodied in the form of a bitstream or other sequence of signal values stored in a non-transitory recording medium generated using a method and/or an apparatus of the present invention.

It will be appreciated by those skilled in the art that although the functional components of the exemplary embodiments of the system of the present invention described herein may be embodied as one or more distributed computer program processes, data structures, dictionaries and/or other stored data on one or more conventional general purpose computers (e.g., IBM-compatible, Apple Macintosh, and/or RISC microprocessor-based computers), mainframes, mini-computers, conventional telecommunications (e.g., modem, T1, fiber-optic line, DSL, satellite and/or ISDN communications), memory storage means (e.g., RAM, ROM) and storage devices (e.g., computer-readable memory, disk array, direct access storage) networked together by conventional network hardware and software (e.g., LAN/WAN network backbone systems and/or Internet), other types of computers and network resources may be used without departing from the present invention. One or more networks discussed herein may be a local area network, wide area network, internet, intranet, extranet, proprietary network, virtual private network, a TCP/IP-based network, a wireless network (e.g., IEEE 802.11 or Bluetooth), an e-mail based network of e-mail transmitters and receivers, a modem-based, cellular, or mobile telephonic network, an interactive telephonic network accessible to users by telephone, or a combination of one or more of the foregoing.

Embodiments of the invention as described herein may be implemented in one or more computers residing on a network transaction server system, and input/output access to embodiments of the invention may include appropriate hardware and software (e.g., personal and/or mainframe computers provisioned with Internet wide area network communications hardware and software (e.g., CQI-based, FTP, Netscape Navigator™, Mozilla Firefox™, Microsoft Internet Explorer™, or Apple Safari™ HTML Internet-browser software, and/or direct real-time or near-real-time TCP/IP interfaces accessing real-time TCP/IP sockets) for permitting human users to send and receive data, or to allow unattended execution of various operations of embodiments of the invention, in real-time and/or batch-type transactions. Likewise, the system of the present invention may include one or more remote Internet-based servers accessible through conventional communications channels (e.g., conventional telecommunications, broadband communications, wireless communications) using conventional browser software (e.g., Netscape Navigator™, Mozilla Firefox™, Microsoft Internet Explorer™, or Apple Safari™). Thus, the present invention may be appropriately adapted to include such communication functionality and Internet browsing ability. Additionally, those skilled in the art will recognize that the various components of the server system of the present invention may be remote from one another, and may further include appropriate communications hardware/software and/or LAN/WAN hardware and/or software to accomplish the functionality herein described.

Each of the functional components of the present invention may be embodied as one or more distributed computer-program processes running on one or more conventional general purpose computers networked together by conventional networking hardware and software. Each of these functional components may be embodied by running distributed computer-program processes (e.g., generated using "full-scale" relational database engines such as IBM DB2™, Microsoft SQL Server™, Sybase SQL Server™, or Oracle 10g™ database managers, and/or a JDBC interface to link to such databases) on networked computer systems (e.g., including mainframe and/or symmetrically or massively-parallel computing systems such as the IBM SB2™ or HP 9000™ computer systems) including appropriate mass storage, networking, and other hardware and software for permitting these functional components to achieve the stated function. These computer systems may be geographically distributed and connected together via appropriate wide- and local-area network hardware and software. In one embodiment, data stored in the token database or other program data may be made accessible to the user via standard SQL queries for analysis and reporting purposes.

Primary elements of embodiments of the invention may be server-based and may reside on hardware supporting an operating system such as Microsoft Windows NT/2000™ or UNIX.

Components of a system consistent with embodiments of the invention may include mobile and non-mobile devices. Mobile devices that may be employed in the present invention include personal digital assistant (PDA) style computers, e.g., as manufactured by Apple Computer, Inc. of Cupertino, Calif., or Palm, Inc., of Santa Clara, Calif., and other computers running the Android, Symbian, RIM Blackberry, Palm webOS, or iPhone operating systems, Windows CE™ handheld computers, or other handheld computers (possibly including a wireless modem), as well as wireless, cellular, or mobile telephones (including GSM phones, J2ME and WAP-enabled phones, Internet-enabled phones and data-capable smart phones), one- and two-way paging and messaging devices, laptop computers, etc. Other telephonic network technologies that may be used as potential service channels in a system consistent with embodiments of the invention include 2.5G cellular network technologies such as GPRS and EDGE, as well as 3G technologies such as CDMA1xRTT and WCDMA2000, and 4G technologies. Although mobile devices may be used in embodiments of the invention, non-mobile communications devices are also contemplated by embodiments of the invention, including personal computers, Internet appliances, set-top boxes, landline telephones, etc. Clients may also include a PC that supports Apple Macintosh™, Microsoft Windows 95/98/NT/ME/CE/2000/XP/Vista/7™, a UNIX Motif workstation platform, or other computer capable of TCP/IP or other network-based interaction. In one embodiment, no software other than a web browser may be required on the client platform.

Alternatively, the aforesaid functional components may be embodied by a plurality of separate computer processes (e.g., generated via dBase™, Xbase™, MS Access™ or other "flat file" type database management systems or products) running on IBM-type, Intel Pentium™ or RISC microprocessor-based personal computers networked together via conventional networking hardware and software and including such other additional conventional hardware and software as may be necessary to permit these functional components to achieve the stated functionalities. In this alternative configuration, since such personal computers typically may be unable to run full-scale relational database engines of the types presented above, a non-relational flat file "table" (not shown) may be included in at least one of the networked personal computers to represent at least portions of data stored by a system according to the present invention. These personal computers may run the Unix, Microsoft Windows NT/2000™ or Windows 95/98/NT/ME/CE/2000/XP/Vista/7™ operating systems. The aforesaid functional components of a system according to the present invention may also include a combination of the above two configurations (e.g., by computer program processes running on a combination of personal computers, RISC systems, mainframes, symmetric or parallel computer systems, and/or other appropriate hardware and software, networked together via appropriate wide- and local-area network hardware and software).

A system according to the present invention may also be part of a larger computerized financial transaction system including multi-database or multi-computer systems or "warehouses" wherein other data types, processing systems (e.g., transaction, financial, administrative, statistical, data extracting and auditing, data transmission/reception, and/or accounting support and service systems), and/or storage methodologies may be used in conjunction with those of the present invention to achieve an overall information management, processing, storage, search, statistical and retrieval solution for a particular lock box service provider, e-payment warehouser, biller organization, financial institution, payment system, commercial bank, and/or for a cooperative or network of such systems.

In one embodiment, source code may be written in an object-oriented programming language using relational databases. Such an embodiment may include the use of programming languages such as C++ and toolsets such as Microsoft's .Net™ framework. Other programming languages that may be used in constructing a system according to the present invention include Java, HTML, Perl, UNIX shell scripting, assembly language, Fortran, Pascal, Visual Basic, and Quick-Basic. Those skilled in the art will recognize that the present invention may be implemented in hardware, software, or a combination of hardware and software.

Accordingly, the term "computer," as used herein, should be understood to mean a combination of hardware and software components including at least one machine having a processor with appropriate instructions for controlling the processor. The term "computer" can be used to refer to more than a single computing device, e.g., multiple personal computers, or one or more personal computers in conjunction with one or more other devices, such as a router, hub, packet-inspection appliance, firewall, etc.

A system consistent with the present invention may interact with established payment networks, e.g., the Automated Clearing House (ACH) to provide payment options such as ACH debits, credit or procurement card payments, and/or paper checks, which may be generated internally or by an external software module, wherein an output file in a format capable of being read by the external module may be generated. Payment by a payer system user using a credit or procurement card may also be effected, to be processed by Internet or other means. In this scenario, additional security levels may be included, e.g., for initiating credit or debit card payments and approving credit or debit card payments, and such appropriate payment-card processing functionality as may be appropriate may be included, as well.

It should also be appreciated from the outset that one or more of the functional components may alternatively be constructed out of custom, dedicated electronic hardware and/or software, without departing from the present invention. Thus, the present invention is intended to cover all such alternatives, modifications, and equivalents as may be included within the spirit and broad scope of the invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A first-computer-implemented method for preventing the transmission of confidential information between a first computer and a second computer in communication with the first computer, the method comprising the steps of:
    (a) the first computer receiving information for performing a transaction, the information including confidential information manually entered by a user;
    (b) the first computer sending the confidential information to a third computer, wherein step (b) is performed without storing, processing, or sending to the third computer any information that, in combination with the confidential information, would require the first computer to comply with any portion of the payment-card industry data-security standard (PCI DSS);
    (c) the first computer receiving, from the third computer, an executable script containing a token from which the confidential information cannot be derived without knowledge of an association made by the third computer between the confidential information and the token, wherein step (c) is performed without storing, processing, or receiving from the third computer any information that, in combination with the confidential information, would require the first computer to comply with any portion of the payment-card industry data-security standard (PCI DSS);
    (d) the first computer executing the script to obtain the token; and
    (e) the first computer sending to the second computer (i) the information for performing the transaction, except for the confidential information, and (ii) the token, wherein step (e) is performed without storing, processing, or sending to the second computer any information that, in combination with the confidential information, would require the first computer to comply with any portion of the payment-card industry data-security standard (PCI DSS).

2. The invention of claim 1, wherein the executable script is a JavaScript Object Notation (JSON) script.

3. The invention of claim 1, wherein:
    in step (b), the first computer sends the confidential information to a third computer via a proxy server; and
    in step (c), the first computer receives the executable script from the third computer via the proxy server.

4. The invention of claim 1, wherein at least one of steps (b) and (c) employs a port-forwarding scheme.

5. The invention of claim 1, further comprising:
    the first computer receiving the confidential information by means of the user typing the confidential information into an entry field of a window displayed by a software program; and
    the first computer replacing the confidential information in the entry field of the window of the software program with the token.

6. The invention of claim 1, wherein, in step (c), the first computer receives the token in the form of a function call argument.

7. Apparatus for preventing the transmission of confidential information to a second computer in communication with the apparatus, the apparatus comprising:
    a processor; and
    non-transitory memory containing instructions for the processor, wherein, when the processor executes the instructions, the apparatus is adapted to:

(a) receive information for performing a transaction, the information including confidential information manually entered by a user;
(b) send the confidential information to a third computer, wherein step (b) is performed without storing, processing, or sending to the third computer any information that, in combination with the confidential information, would require the apparatus to comply with any portion of the payment-card industry data-security standard (PCI DSS);
(c) receive, from the third computer, an executable script containing a token from which the confidential information cannot be derived without knowledge of an association made by the third computer between the confidential information and the token, wherein step (c) is performed without storing, processing, or receiving from the third computer any information that, in combination with the confidential information, would require the apparatus to comply with any portion of the payment-card industry data-security standard (PCI DSS);
(d) execute the script to obtain the token; and
(e) send to the second computer (i) the information for performing the transaction, except for the confidential information, and (ii) the token, wherein step (e) is performed without storing, processing, or sending to the second computer any information that, in combination with the confidential information, would require the apparatus to comply with any portion of the payment-card industry data-security standard (PCI DSS).

8. The invention of claim 7, wherein the executable script is a JavaScript Object Notation (JSON) script.

9. The invention of claim 7, wherein:
in step (b), the apparatus sends the confidential information to a third computer via a proxy server; and
in step (c), the apparatus receives the executable script from the third computer via the proxy server.

10. The invention of claim 7, wherein at least one of steps (b) and (c) employs a port-forwarding scheme.

11. The invention of claim 7, wherein the apparatus is further adapted to:
receive the confidential information by means of the user typing the confidential information into an entry field of a window displayed by a software program; and
replace the confidential information in the entry field of the window of the software program with the token.

12. The invention of claim 7, wherein, in step (c), the apparatus receives the token in the form of a function call argument.

13. A first-computer-implemented method for preventing the transmission of confidential information between a first computer and a second computer in communication with the first computer, the method comprising the steps of:
(a) the first computer receiving, from an entry device in communication with the first computer, information for performing a transaction, the information including confidential information manually entered by a user on the entry device;
(b) the first computer sending the confidential information to a third computer, wherein step (b) is performed without storing, processing, or sending to the third computer any information that, in combination with the confidential information, would require the first computer to comply with any portion of the payment-card industry data-security standard (PCI DSS);
(c) the first computer receiving, from the third computer, a token from which the confidential information cannot be derived without knowledge of an association made by the third computer between the confidential information and the token, wherein step (c) is performed without storing, processing, or receiving from the third computer any information that, in combination with the confidential information, would require the first computer to comply with any portion of the payment-card industry data-security standard (PCI DSS); and
(d) the first computer sending to the second computer (i) the information for performing the transaction, except for the confidential information, and (ii) the token, wherein step (d) is performed without storing, processing, or sending to the second computer any information that, in combination with the confidential information, would require the first computer to comply with any portion of the payment-card industry data-security standard (PCI DSS).

14. The invention of claim 13, wherein:
the confidential information manually entered by the user on the entry device is provided to the first computer in encrypted form;
the form of encryption employs one or more keys for decrypting the confidential information; and
the first computer does not have the one or more keys.

15. The invention of claim 13, wherein the entry device is coupled to the first computer via a Universal Serial Bus (USB) interface.

16. The invention of claim 13, wherein the entry device is a PIN-entry pad having firmware configured to:
accept, via keypad entry, a number longer than four digits and sufficiently long to accommodate a payment-card number;
encrypt the number; and
output, to the first computer, the encrypted number in step (a).

17. The invention of claim 16, wherein the number is encrypted using a Derived Unique Key Per Transaction (DUKPT) key-management scheme.

18. Apparatus for preventing the transmission of confidential information between a first computer and a second computer in communication with the first computer, the apparatus comprising:
a processor; and
non-transitory memory containing instructions for the processor, wherein, when the processor executes the instructions, the apparatus is adapted to:
(a) receive, from an entry device in communication with the first computer, information for performing a transaction, the information including confidential information manually entered by a user on the entry device;
(b) send the confidential information to a third computer, wherein step (b) is performed without storing, processing, or sending to the third computer any information that, in combination with the confidential information, would require the apparatus to comply with any portion of the payment-card industry data-security standard (PCI DSS);
(c) receive, from the third computer, a token from which the confidential information cannot be derived without knowledge of an association made by the third computer between the confidential information and the token, wherein step (c) is performed without storing, processing, or receiving from the third computer any information that, in combination with the confidential information, would require the apparatus to comply with any portion of the payment-card industry data-security standard (PCI DSS); and (d) send to the second computer (i) the information for performing the transaction, except for the confidential information, and (ii) the token, wherein step (d) is performed without storing, processing, or sending to the second computer any information that, in combination with the confidential information, would require the apparatus to comply with any portion of the payment-card industry data-security standard (PCI DSS).

19. The invention of claim 18, wherein:

the confidential information manually entered by the user on the entry device is provided to the first computer in encrypted form;

the form of encryption employs one or more keys for decrypting the confidential information; and the first computer does not have the one or more keys.

20. The invention of claim 18, wherein the entry device is coupled to the first computer via a Universal Serial Bus (USB) interface.

21. The invention of claim 18, wherein the entry device is a PIN-entry pad having firmware configured to:

accept, via keypad entry, a number longer than four digits and sufficiently long to accommodate a payment-card number;

encrypt the number; and output, to the first computer, the encrypted number in step (a).

22. The invention of claim 21, wherein the number is encrypted using a Derived Unique Key Per Transaction (DUKPT) key-management scheme.

23. A method for generating an encrypted payment-card number, the method comprising:

accepting, via a keypad, a number longer than four digits and sufficiently long to accommodate a payment-card number;

encrypting the number; and outputting the encrypted number, via an interface, to a software program adapted to obtain, using the encrypted number, a token from which the confidential information cannot be derived without knowledge of a predetermined association made between the confidential information and the token, wherein the step of outputting is performed without storing, processing, or sending any information that would require a first computer on which the software program resides to comply with any portion of the payment-card industry data-security standard (PCI DSS), wherein:

the association between the confidential information and the token is stored in a second computer; and the first computer is adapted to send to a third computer (i) information for performing a transaction, except for the confidential information, and (ii) the token, without the first computer storing, processing, or sending to the third computer any information that, in combination with the confidential information, would require the first computer to comply with any portion of the payment-card industry data-security standard (PCI DSS); and the third computer is adapted to obtain the confidential information from the second computer using the token.

24. A payment-card number entry device comprising:

a keypad;

a processor;

an interface; and a non-transitory memory containing instructions for the processor to:

accept, via the keypad, a number longer than four digits and sufficiently long to accommodate a payment-card number;

encrypt the number; and output the encrypted number, via the interface, to a software program adapted to obtain, using the encrypted number, a token from which the confidential information cannot be derived without knowledge of a predetermined association made between the confidential information and the token, wherein the step of outputting is performed without storing, processing, or sending any information that would require a first computer on which the software program resides to comply with any portion of the payment-card industry data-security standard (PCI DSS), wherein:

the association between the confidential information and the token is stored in a second computer; and the first computer is adapted to send to a third computer (i) information for performing a transaction, except for the confidential information, and (ii) the token, without the first computer storing, processing, or sending to the third computer any information that, in combination with the confidential information, would require the first computer to comply with any portion of the payment-card industry data-security standard (PCI DSS); and the third computer is adapted to obtain the confidential information from the second computer using the token.

* * * * *